(12) United States Patent
Veltrop et al.

(10) Patent No.: US 8,136,701 B2
(45) Date of Patent: Mar. 20, 2012

(54) FIXED-VOLUME LIQUID DISPENSER

(75) Inventors: Loren Veltrop, Chicago, IL (US);
Robert Long, Glenview, IL (US);
Randall Scott Koplin, Fitchburg, WI
(US); Kent J. Kallsen, Jefferson, WI
(US); Douglas S. Rodenkirch, Sun
Prairie, WI (US); Don Van Erden,
Wildwood, IL (US)

(73) Assignee: Prince Castle, LLC, Carol Stream, IL (US)

( * ) Notice: Subject to any disclaimer, the term of this patent is extended or adjusted under 35 U.S.C. 154(b) by 754 days.

(21) Appl. No.: 12/236,207

(22) Filed: Sep. 23, 2008

(65) Prior Publication Data
US 2010/0072229 A1    Mar. 25, 2010

(51) Int. Cl.
*B65D 37/00* (2006.01)
(52) U.S. Cl. ........... 222/207; 222/249; 222/365; 222/80
(58) Field of Classification Search ........... 222/207, 222/213, 365, 80
See application file for complete search history.

(56) References Cited

U.S. PATENT DOCUMENTS

| 2,245,265 | A | * | 6/1941 | Eddy | 222/243 |
| 4,603,794 | A | * | 8/1986 | DeFord et al. | 222/207 |
| 6,341,718 | B1 | * | 1/2002 | Schilthuizen et al. | 222/207 |
| 6,484,906 | B2 | * | 11/2002 | Bonningue | 222/207 |
| 7,328,819 | B2 | * | 2/2008 | Lewis | 222/181.3 |

* cited by examiner

*Primary Examiner* — Kevin P Shaver
*Assistant Examiner* — Melvin Cartagena
(74) *Attorney, Agent, or Firm* — Kelly & Krause, LP; Joseph P. Krause

(57) ABSTRACT

A dispenser for viscous liquids effectuates sequential operations by hydrostatic pressure on an assembly of two pistons separated from each other in a cylinder by a separation spring. When the piston assembly is embedded in material to be dispensed, the space between the pistons fills with material to be dispensed. Pressuring the reservoir by squeezing it or by the addition of pressurized gas, forces the piston assembly down the cylinder at the end of which is an opening from which material in the piston assembly can escape. One of the pistons moves toward the other end by pressure from the reservoir, causing material in the piston assembly to be dispensed. The volume inside the piston assembly defines and limits the volume of material that can be dispensed.

1 Claim, 21 Drawing Sheets

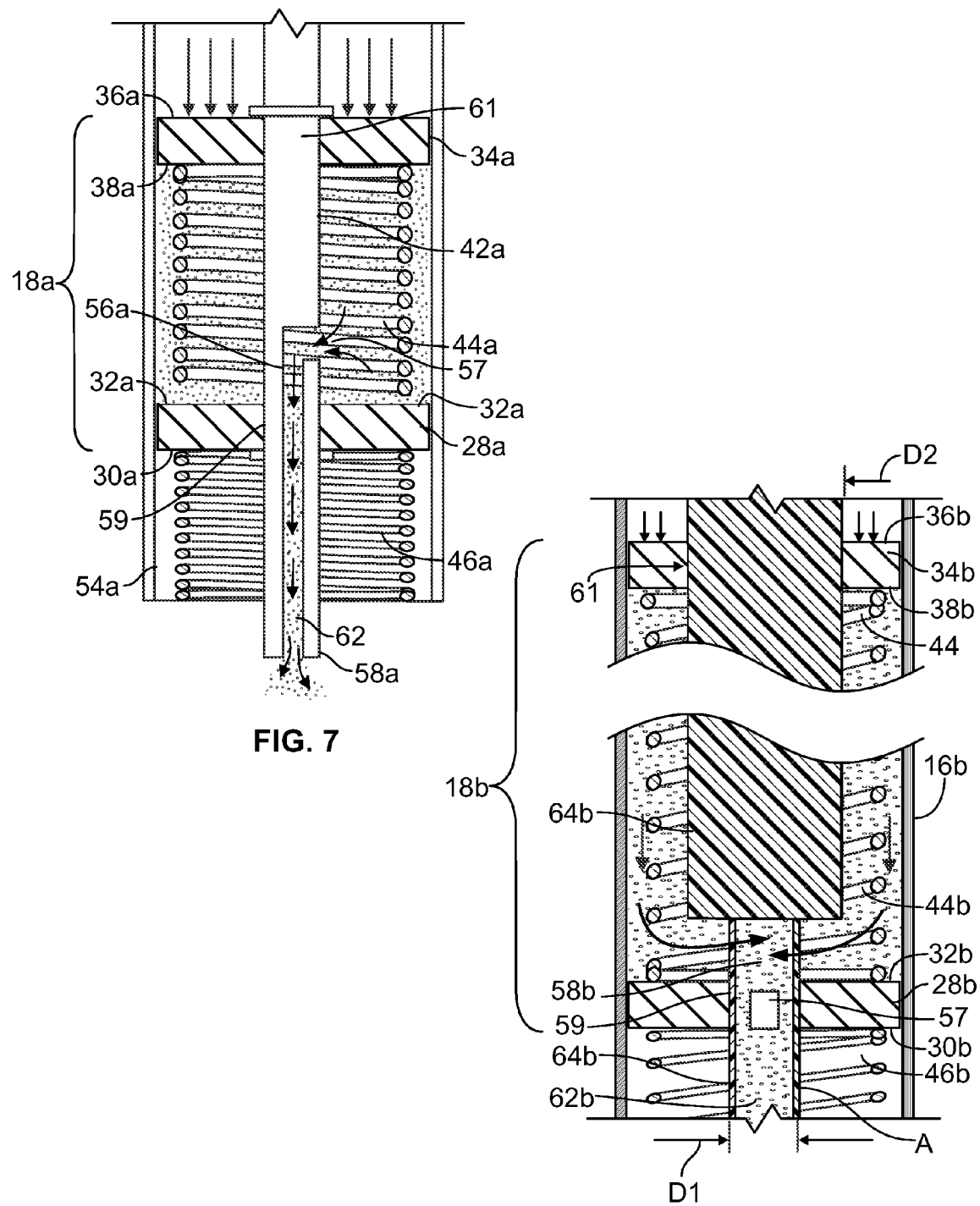

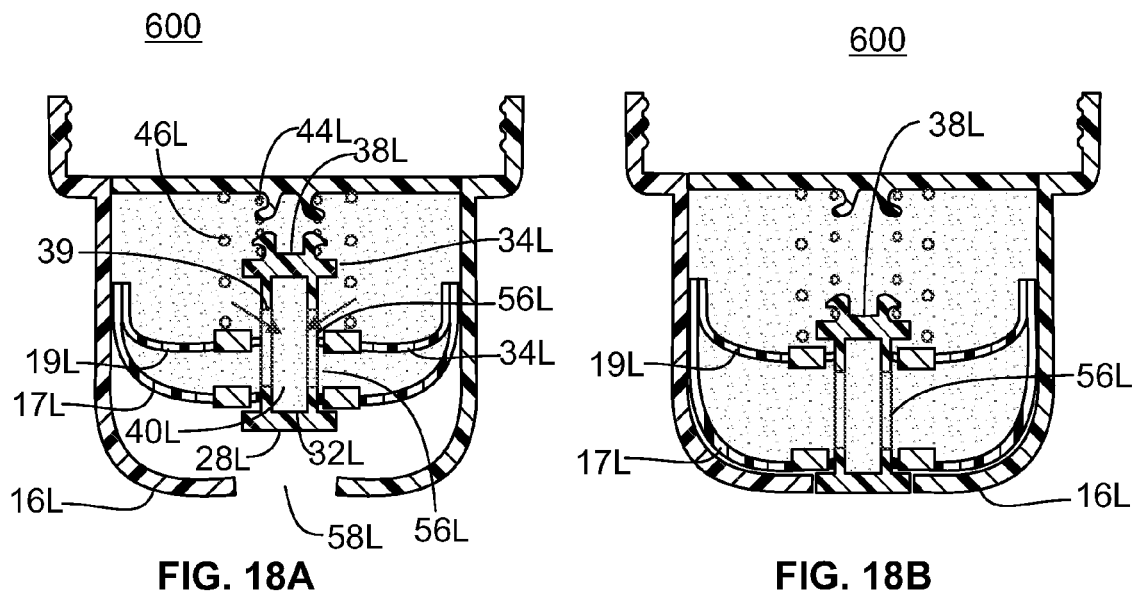
FIG. 18A  FIG. 18B
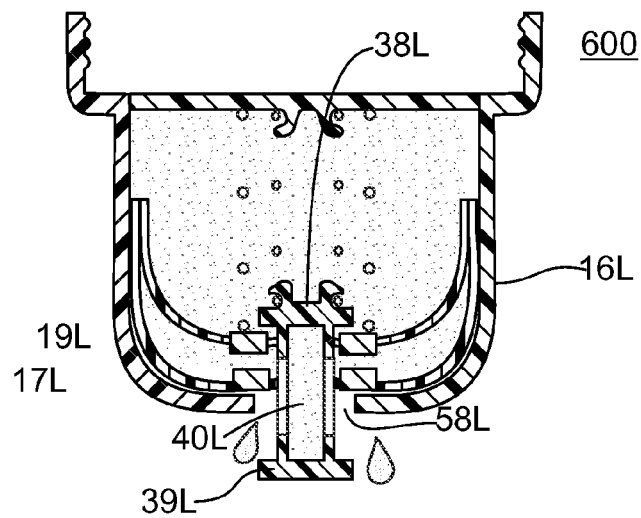
FIG. 18C

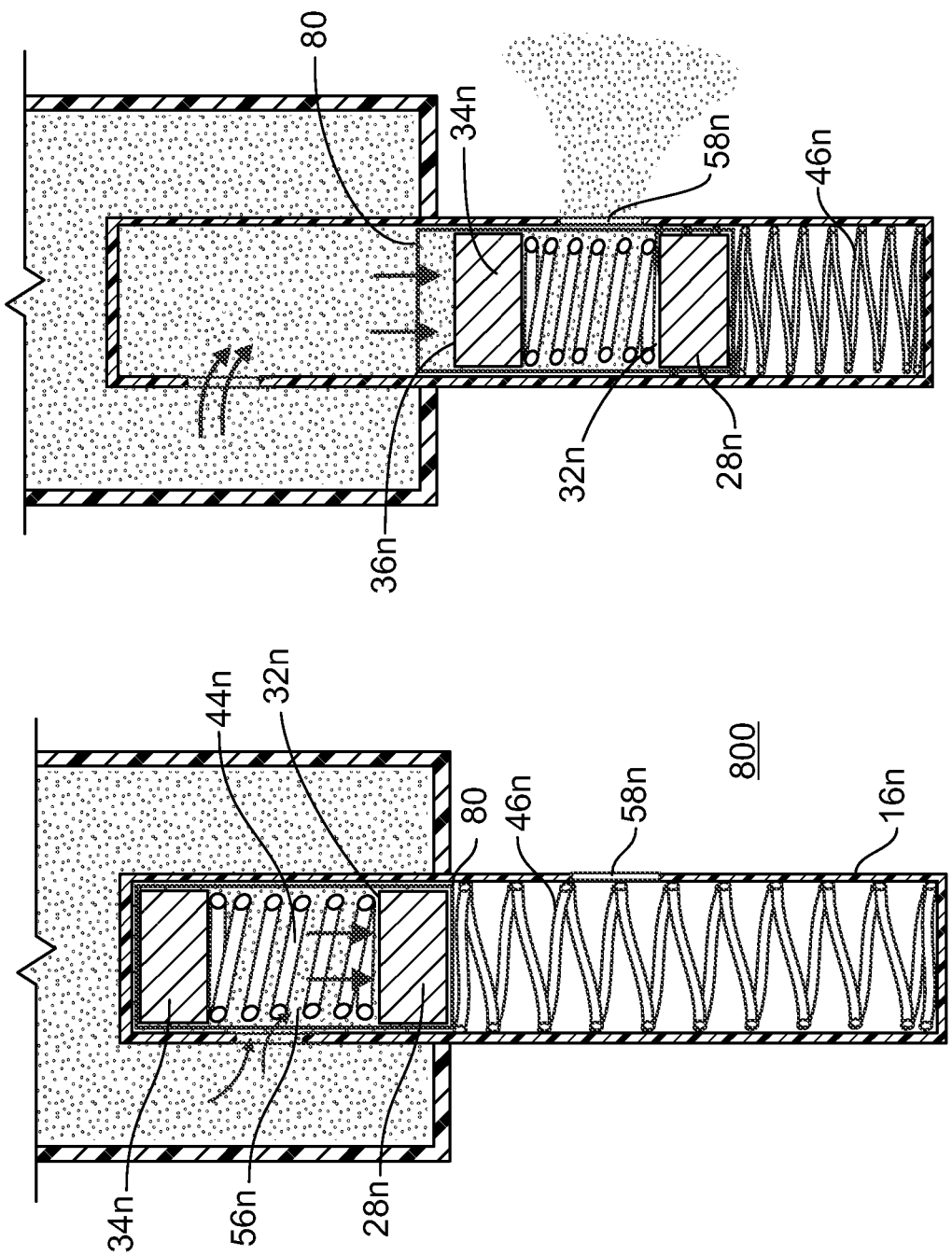

FIXED-VOLUME LIQUID DISPENSER

BACKGROUND OF THE INVENTION

Portion control and finished product consistency are important to fast food restaurants, especially national restaurant chains, whose trademarks tend to connote product consistency. Portion control and product consistency are also important to the food service industry in general as a way to control costs.

Most establishments that prepare or serve sandwiches with condiments such as ketchup, mustard, relish and mayonnaise, often prefer to make and/or serve them with the same amount of condiment on each sandwich, regardless of when or where the product was produced and/or by whom. While fixed-volume condiment dispensers exists, they require a motive power other than a user's own strength. A simple and inexpensive hand-held device that can consistently and reliably dispense the same volume of condiment with each and every use, and which is powered by a user would be an improvement over the prior art. A dispenser that can also be easily disassembled for maintenance would also be an improvement over the prior art.

BRIEF DESCRIPTION OF THE DRAWINGS

FIG. 7 is an alternate embodiment of the connector and piston assembly to dispense material from the end of the cylinder;

FIG. 8 is an alternate embodiment of the connector and piston assembly to dispense small amounts of material from the end of the cylinder FIGS. 10-20 depict alternate embodiments of the cap and piston assembly and which are for use with a reservoir, such as the reservoir depicted in FIG. 1.

DETAILED DESCRIPTION

Figure 1:
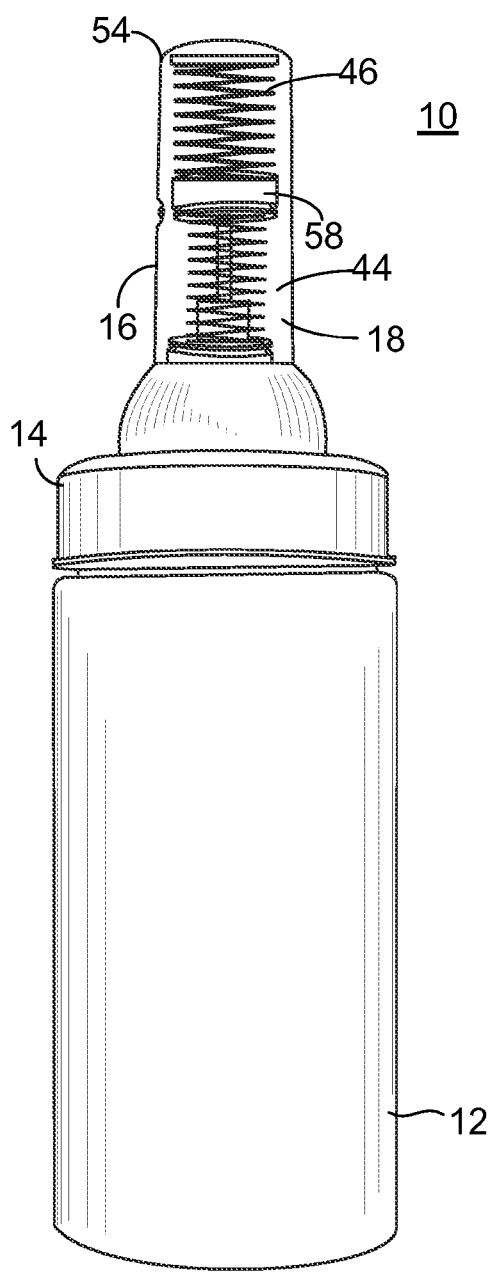
FIG. 1 depicts a dispenser for dispensing a fixed volume of viscous liquid material.

FIG. 1 depicts a simple and inexpensive, user-powered dispenser 10 for dispensing a fixed volume of viscous material. The dispenser 10 is comprised of a flexible bottle or reservoir 12, a removable cap 14 that covers the reservoir 12 and an elongated cylinder 16 that extends or passes through the cap 14 and which encloses a reciprocating piston assembly 18.

The piston assembly 18 performs multiple functions. It captures or sections off material from within the reservoir, that is to be dispensed. It shuttles sectioned-off material down the elongated cylinder 16 to an opening 58 near the bottom 54 of the cylinder 16 from which material is dispensed. The piston assembly 18 also dispenses the sectioned off from the cylinder 16 after the piston assembly 18 has shuttled the sectioned off material down the cylinder 16 to the aforementioned opening 58. The piston assembly performs several functions using hydrostatic pressure from the reservoir.

Figure 2:
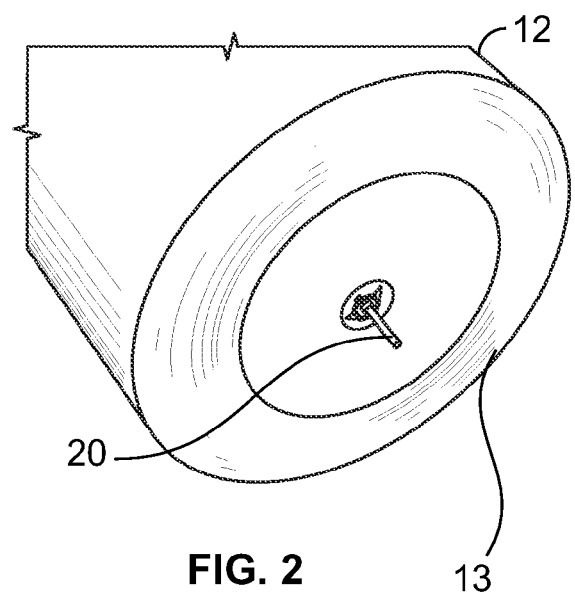
FIG. 2 shows the bottom of the reservoir of the dispenser shown in FIG. 1.

The reservoir 12 depicted in the figures is formed from a compliant and resilient material such as a vinyl or polyolefins that include polypropylene and polyethylene, PET polyethylene terapthalate and PBTs. Squeezing the reservoir 12 so that it compresses, reduces the interior volume of the reservoir 12, which increases the pressure inside the reservoir 12. The increased internal pressure causes material in the reservoir 12 to be dispensed from the end of the elongated cylinder 16 by several consecutive actions of the piston assembly 18. When the reservoir 12 is released, the material from which the reservoir 12 is made will attempt to return to its original shape, creating a negative pressure inside the reservoir. As shown in FIG. 2, a one-way vent 20 in the bottom 13 of the reservoir 12 allows air to flow into the reservoir when the reservoir expands but does not allow air to flow out of the reservoir when the reservoir is compressed, thereby facilitating the reservoir's return to its original shape and without having to draw material back into the piston assembly 18, and then back into the reservoir 12.

Alternate and equivalent embodiments of a reservoir include an elongated flexible hose or tube (not shown) coupled on one end to the first end of the cylinder 16 so that material to be dispensed can flow into the piston assembly. The opposite end of such a hose or tube would be coupled to a canister containing material to be dispensed. In such an embodiment, a hydrostatic pressure can be provided to the material by a separate, controllable source of compressed gas to either the bottle or canister. Hydrostatic pressure can also be applied to the material in the hose and by way of a pump, located between the canister and the cylinder with the piston assembly.

Figure 3:
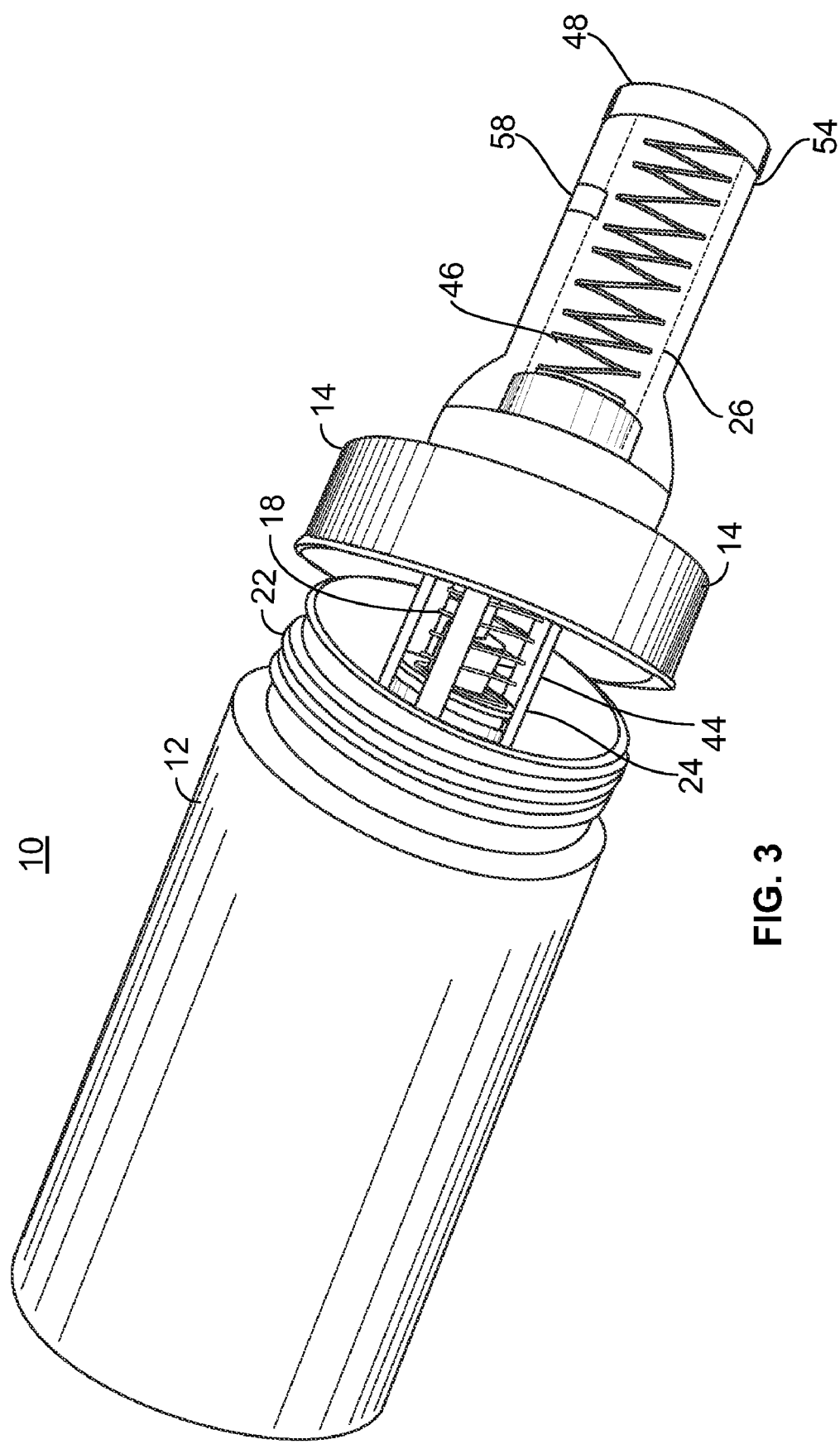
FIG. 3 shows the dispenser of FIG. 1 with the top partially removed.

FIG. 3 shows that the reservoir 22 has a top 12 that is provided with a male thread 22, which screws into a mating female thread (not shown), which is formed into the cap 14. The elongated cylinder 16, which houses the reciprocating piston assembly 18 and from which material is dispensed, extends through the cap 14 or is formed as part of the cap 14 such that a first part 24 of the cylinder 16 is inside the reservoir 12 while a second part 26 of the cylinder 16 is outside the reservoir 12. The threaded connection of the cap 14 to the reservoir 12 provides a mechanically robust and air-tight seal to the reservoir 12. A threaded connection also allows the cap and the reservoir 12 to be easily separated from each other so that the reservoir 12 can be re-filled. It also allows the cylinder 16 and parts inside the cylinder 16 to be cleaned and serviced. Dispensed material flows out the second opening 58, which is near the bottom 54 of the cylinder 16.

Figure 4:
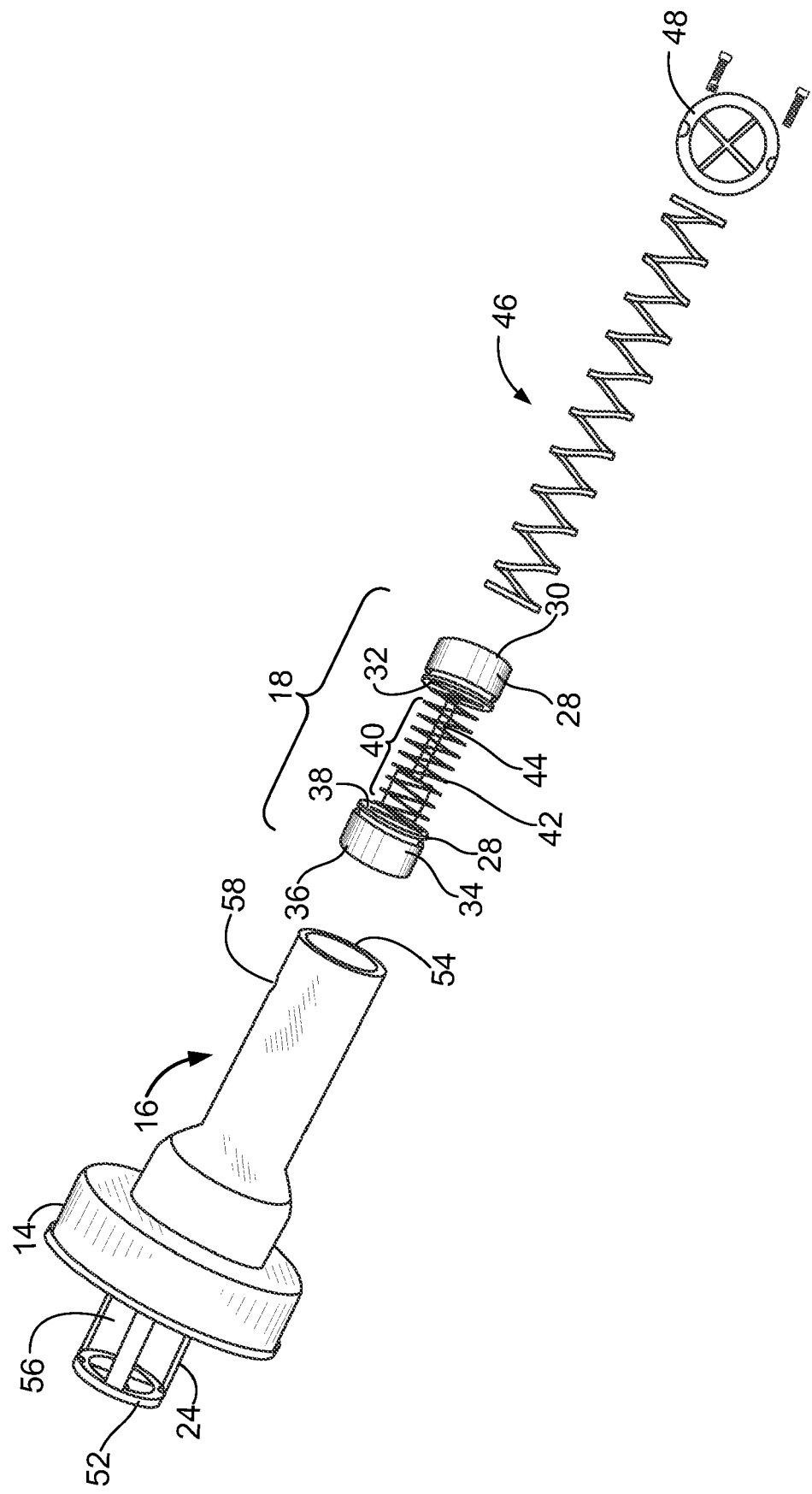
FIG. 4 is an exploded view of the dispenser top and piston assembly.
Figure 5:
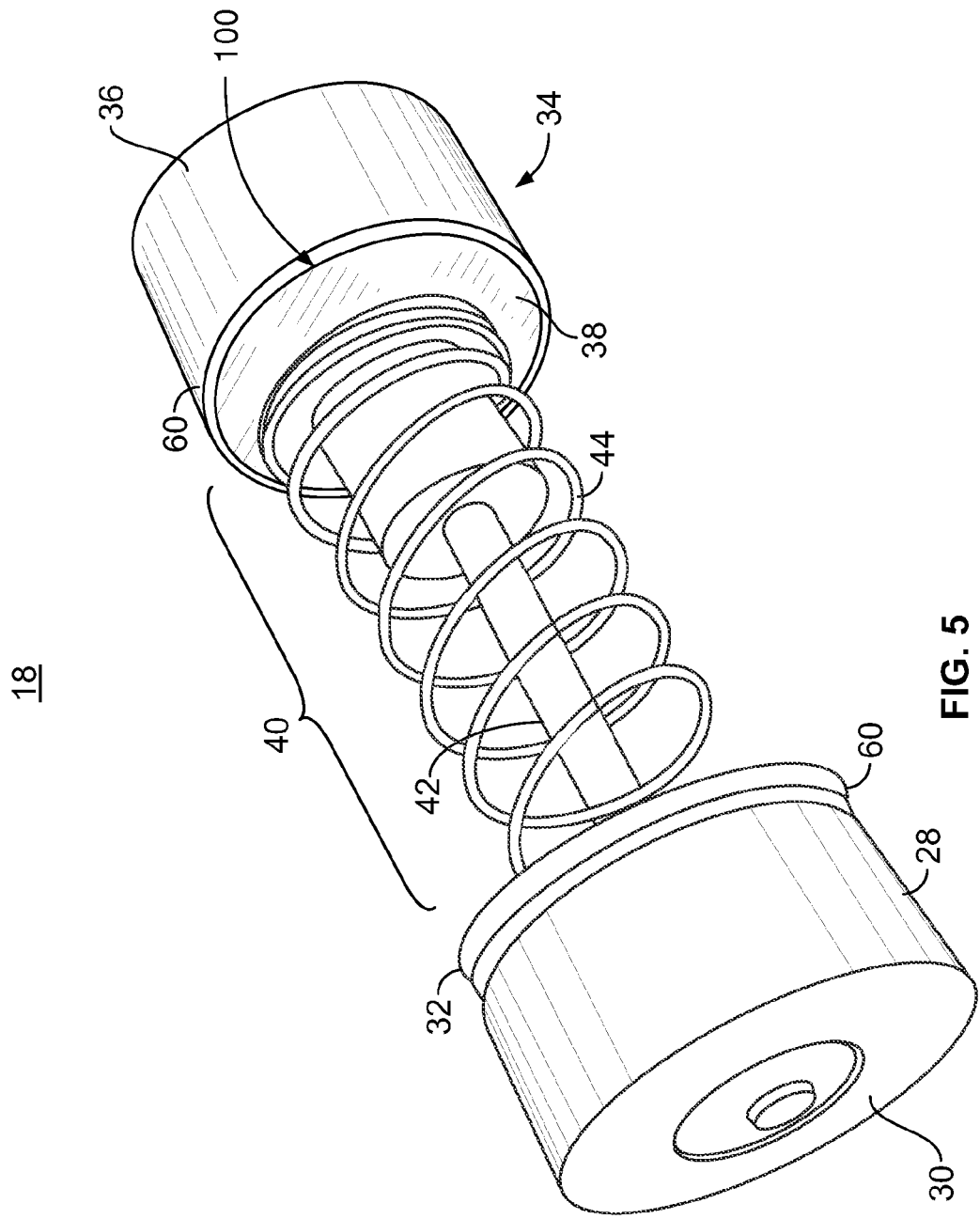
FIG. 5 shows the piston assembly that sections-off material to be dispensed.

FIG. 4 is an exploded view of the cap 14 and the reciprocating piston assembly 18 that translates back and forth in the cylinder 16. The reciprocating piston assembly 18 is comprised of a first piston 28 and an opposing second piston 34. The first piston 28 has a bottom 30 and a top or piston head 32. The second piston 34 also has a bottom 36 and a piston head 38, which is best seen in FIG. 5

The opposing pistons 28 and 34 are attached to a piston separation-distance limiting connector 42, which is also referred to herein as a piston connector. The piston connector 46 is substantially un-stretchable in order to limit the distance that can separate the two pistons 28 and 34 from each other as they travel back and forth in the cylinder. In a preferred embodiment, a coiled piston separation spring 44 is wound around the piston connector 46, which biases the two pistons away from each other.

The piston separation spring 44 has a relaxed length greater than the maximum piston separation distance permitted by the connector 42 in order for the piston separation spring 44 to be able to maintain a bias force on the piston heads 32 and 38 that keeps the pistons separated from each other when the piston assembly 18 is at rest, i.e., not subjected to pressure.

FIG. 4 also shows a piston assembly return spring 46, which is located inside the cylinder 16 and positioned between the bottom of the first piston 28 of the piston assembly 18 and a retaining cap 48 that is affixed to the second end of the cylinder 16. The return spring 46 is compressed when the piston assembly 18 travels away from the reservoir and toward the second end of the cylinder 12. It therefore exerts force on the bottom of the first piston 28, which tends to drive the piston assembly 18 back to the reservoir 12 when hydrostatic pressure from the reservoir 12 exerted on the piston assembly is released. The retaining cap 48 is held in place by screws in one embodiment, but can also be held in place by adhesive or snapped into place.

FIG. 5 is a perspective view of the piston assembly 18. The "first piston" 28 is located on the left side of the piston assembly 18 and toward the left side of FIG. 5. The "second piston" 34 is on the right side of the piston assembly 18 and toward the right side of FIG. 5. As described more fully below, the distance or void 40 between the heads 32 and 38 of the two pistons 28 and 34 when they are in the reservoir 12, determines the maximum amount of material that can be dispensed from the dispenser 10. Delivering the same amount of material with each squeeze of the reservoir 12 thus requires the piston connector 42 to be inelastic, i.e., not stretchable, because an elongation of the connector 42 would increase the space between the pistons and therefore increase the volume of material sectioned off between them.

In a preferred embodiment, the connector 42 is a thin, hollow metal shaft that extends through holes formed into the centers of each piston 28 and 34. Alternate embodiments of the connector 42 include inelastic or substantially inelastic wire, chain and string, which can be fabricated from any appropriate material, such as metal or plastic.

In the embodiment wherein the connector 42 is a shaft, the first piston 28 is fixedly attached to one end of the shaft. The second piston 34 on the other hand is able to slide over the shaft. A stop 50 (not shown) prevents the second piston 34, which is movable, from coming off the shaft 42. The second piston 34 is able to freely travel toward and away from the first piston 28 in response to forces exerted on the pistons 28 and 34 from the piston separation spring 44, the return spring 46 and hydrostatic pressure exerted on the piston assembly from the reservoir 12.

As described more fully below, when the piston assembly 18 is at the top 52 (See FIG. 4.) of the cylinder 16, i.e., within the reservoir 12, the space 40 between the two pistons 28 and 34 can fill with material to be dispensed, either by gravity or by squeezing the reservoir 12. When the space 40 between the pistons is full or even partially fully, squeezing the reservoir 12 causes several events to occur in succession, the conclusion of which is dispensing material from the reservoir 12.

When the piston assembly 18 is at its starting position at or near the top 52 of the cylinder 16, squeezing the reservoir 12 reduces the interior volume of the reservoir and causing air to try to pass through the check valve/vent 20. Air flow through the check valve/vent 20 closes to check/valve vent to seal the reservoir 12. After the check valve/vent 20 is closed, squeezing the reservoir 12 further causes hydrostatic pressure inside the reservoir 12 to increase relative to the ambient, atmospheric pressure outside the reservoir 12. A higher-than-atmospheric hydrostatic pressure inside the reservoir 12 exerts a distributed force on the head 32 of the first piston 28, which those of ordinary skill will recognize to be equal to the reservoir pressure, above atmospheric pressure, multiplied by the area of the piston head 32. Since the bottom 30 of the first piston 28 is exposed to a lower, i.e., atmospheric pressure through the second opening 58 in the bottom of the cylinder 16, force on the head 32 due to the hydrostatic pressure inside the reservoir 12 will be greater than the pressure exerted on the piston's bottom by the ambient, atmospheric pressure, causing the first piston 28 to be pushed down the cylinder 16, toward the second opening 58 and away from the reservoir. As the first piston 28 moves down the cylinder 16 due to hydrostatic pressure on the head 32 of the first piston 28, the first piston pulls the second piston 34 due to the fact that the two pistons are connected to each other through the inelastic piston connector 42.

When the second piston 34 is pulled down the cylinder far enough so that it is below the first opening 56 in the cylinder 12, the second piston 34 acts as a valve to close off the cylinder 16 below the first opening 56. After the second piston 34 is pulled below the first opening 56 by hydrostatic pressure on the head 32 of the first piston 28, hydrostatic pressure from the reservoir will thereafter be applied to the bottom 36 of the second piston 34. The hydrostatic pressure on the bottom 36 of the second piston 34 thereafter pushes the piston assembly 18 down the cylinder 16. When the piston assembly 18 reaches the bottom of its travel in the cylinder 16, hydrostatic pressure on the bottom 36 of the second piston 34 forces material out of the second opening 58 in the cylinder, thereby dispensing sectioned-off material in the piston assembly, out the second opening 58.

After the piston assembly reaches the bottom of its travel, the amount of material that is actually dispensed will depend on how far the second piston 34 travels downward toward the first piston. The amount of material actually dispensed can therefore be less than but not more than the amount of material sectioned off by the piston assembly. The amount of pressure applied to the second piston as well as the amount of time that a pressure is applied to the bottom of the second piston can therefore determine, and therefore vary the amount of material that is actually dispensed. The claims should therefore not be construed to require all of the sectioned off material to be dispensed.

As explained more fully below, spring constants of the two springs 44 and 46 affect the operation of the dispenser 10. As noted above, after the hydrostatic pressure on the first piston pulls the piston assembly 18 down to below the first opening 56, hydrostatic pressure on the bottom 36 of the second piston 34 will first push the second piston 34 against the piston separation spring 44, which will tend to compress the piston separation spring 44. The hydrostatic force on the bottom of the second piston 34 will also push the second piston 34 against the incompressible sectioned-off material between the two pistons 28 and 34. The hydrostatic pressure will thereafter continue to push the piston assembly 18 down the cylinder 16.

When the head 32 of the first piston 28 passes the second opening 58 in the cylinder, which is at the bottom 54 or "second end" of the cylinder, the head 32 of the first piston 28 effectively becomes a second open valve in the cylinder 12, embodied as the second opening 58 in the cylinder 16 and the first piston 28 as it goes past the second opening 58. When the head 32 of the first piston 28 goes below the second opening 58, hydrostatic pressure on the bottom of the second piston can continue to push the second piston 34 downwardly, sliding the second piston 34 over the piston connector 42, pushing the sectioned-off material between the pistons 28 and 34 out the second opening 58. Hydrostatic pressure thus causes the piston separation spring 44 to compress as the second piston 34 is forced downwardly. As stated above, squeezing the reservoir 12 thus causes several different actions to be performed in sequence: material in the reservoir, is sectioned off between the pistons when the piston assembly is inside the reservoir; the sectioned off material is translated down the cylinder in the piston assembly 18, toward the second opening 58; and finally, the sectioned off material is dispensed from the second opening.

FIGS. 6A-6D show how the piston assembly 18 operates to effectuate the several sequential operations described above.

Figure 6A:
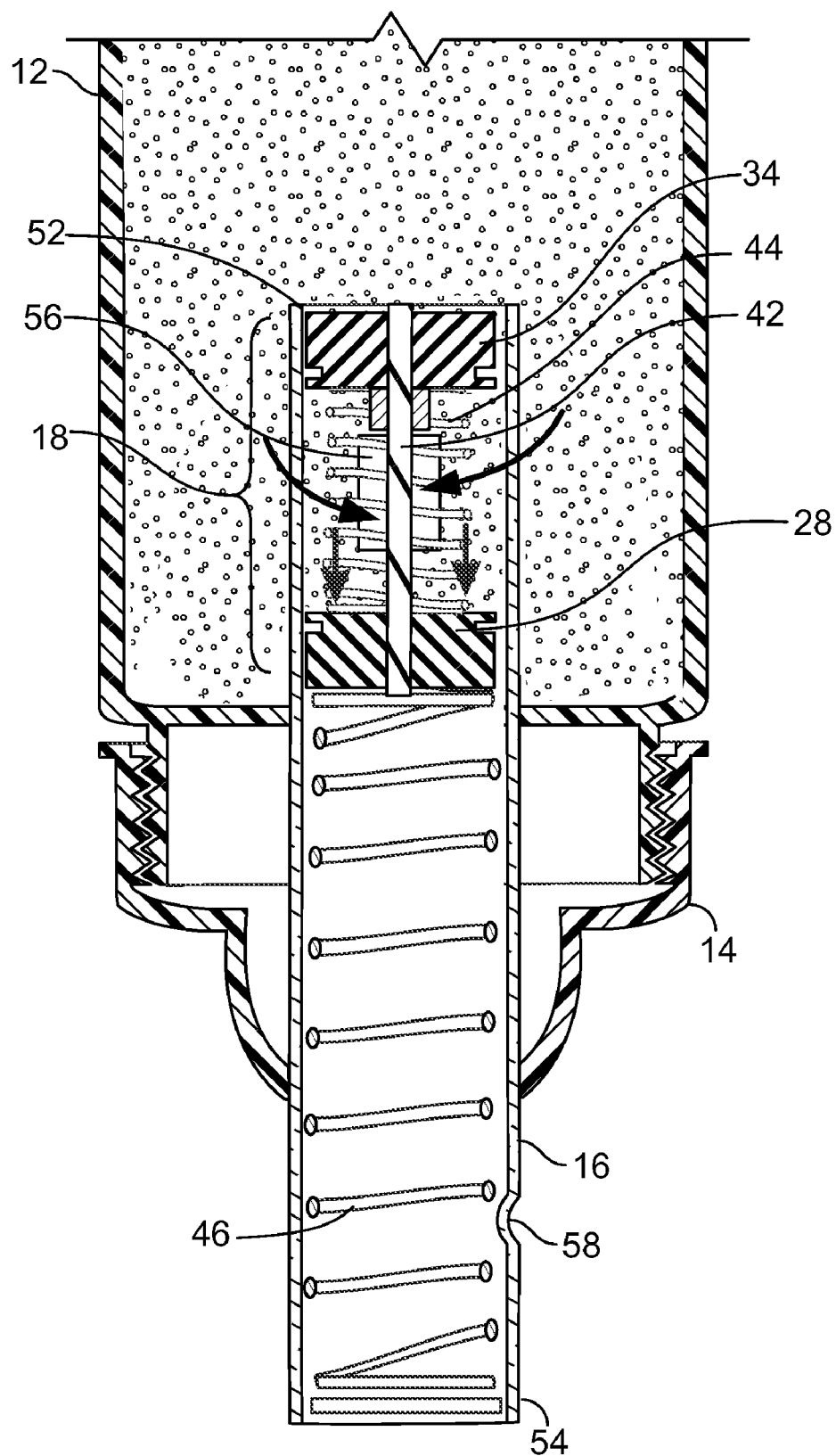
FIGS. 6A-6D depict movement of the piston assembly in response to hydrostatic pressure exerted by the reservoir.

FIG. 6A depicts the dispenser 10 at its starting position. The reservoir 12 is relaxed and not compressed and the piston assembly 18 is held at the top of the cylinder 16, inside the reservoir 12, by force exerted on the bottom 30 of first piston 28 by the piston assembly return spring 46. The second piston 34 is held away from the first piston 28 by the piston separation spring 44. The space or volume 40 between the two pistons 28 and 34 defines the maximum volume of material that can be dispensed. In FIG. 6A, material to be dispensed from the dispenser 10 is depicted as having flowed into and filled the volume 40 between the heads 32 and 38 of the pistons 28 and 34.

Figure 6B:
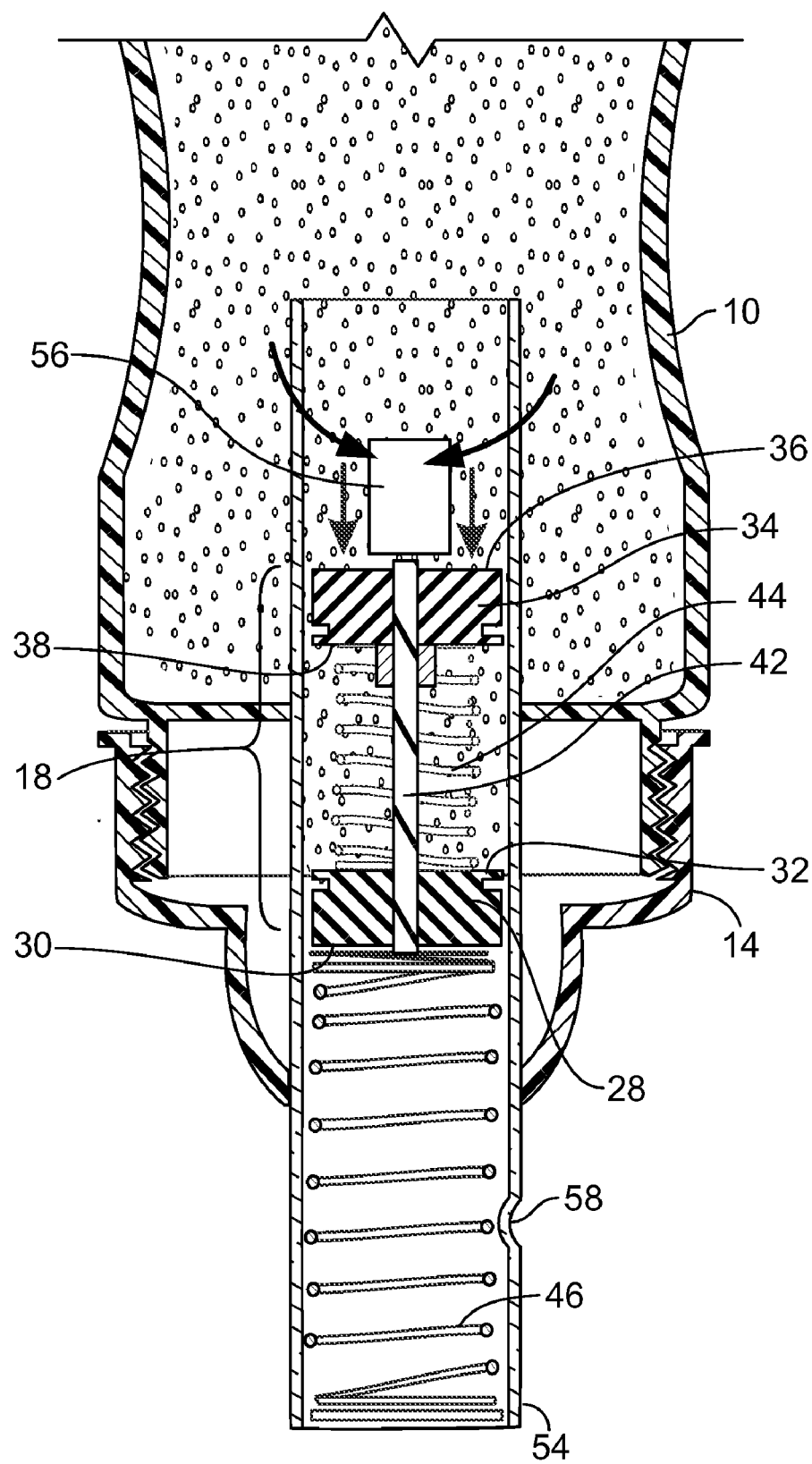

FIG. 6B depicts the reservoir 12 deformed inwardly by the exertion of moderate pressure by a user (not shown). The check valve/vent 20 (not shown), which has closed due to the air trying to escape, allows pressure inside the reservoir 12 to increase, as the reservoir is compressed. Hydrostatic pressure applied to the head 32 of the first piston 28 causes the first piston 28 to move down the cylinder 16 toward the second opening 58, pulling the second piston 34 along with it, through the inelastic connector 42. When the head 38 of the second piston 34 goes below the first opening 56 in the cylinder 16, as shown in FIG. 6B, hydrostatic pressure on the bottom 36 of the second piston 34 thereafter pushes the piston assembly 18 down the cylinder 16. Since the sectioned off material between the pistons is liquid and incompressible, force applied to the bottom 36 of the second piston 34 drives the entire piston assembly 18 downward, as long as the force exerted on the bottom 36 of the second piston 34 is greater than an upward and opposing force applied to the bottom 30 of the first piston 28 by the piston assembly return spring 46. The farther the piston assembly 18 moves down the cylinder 16 toward the second opening 58, the more it will compress the return spring 46.

Figure 6C:
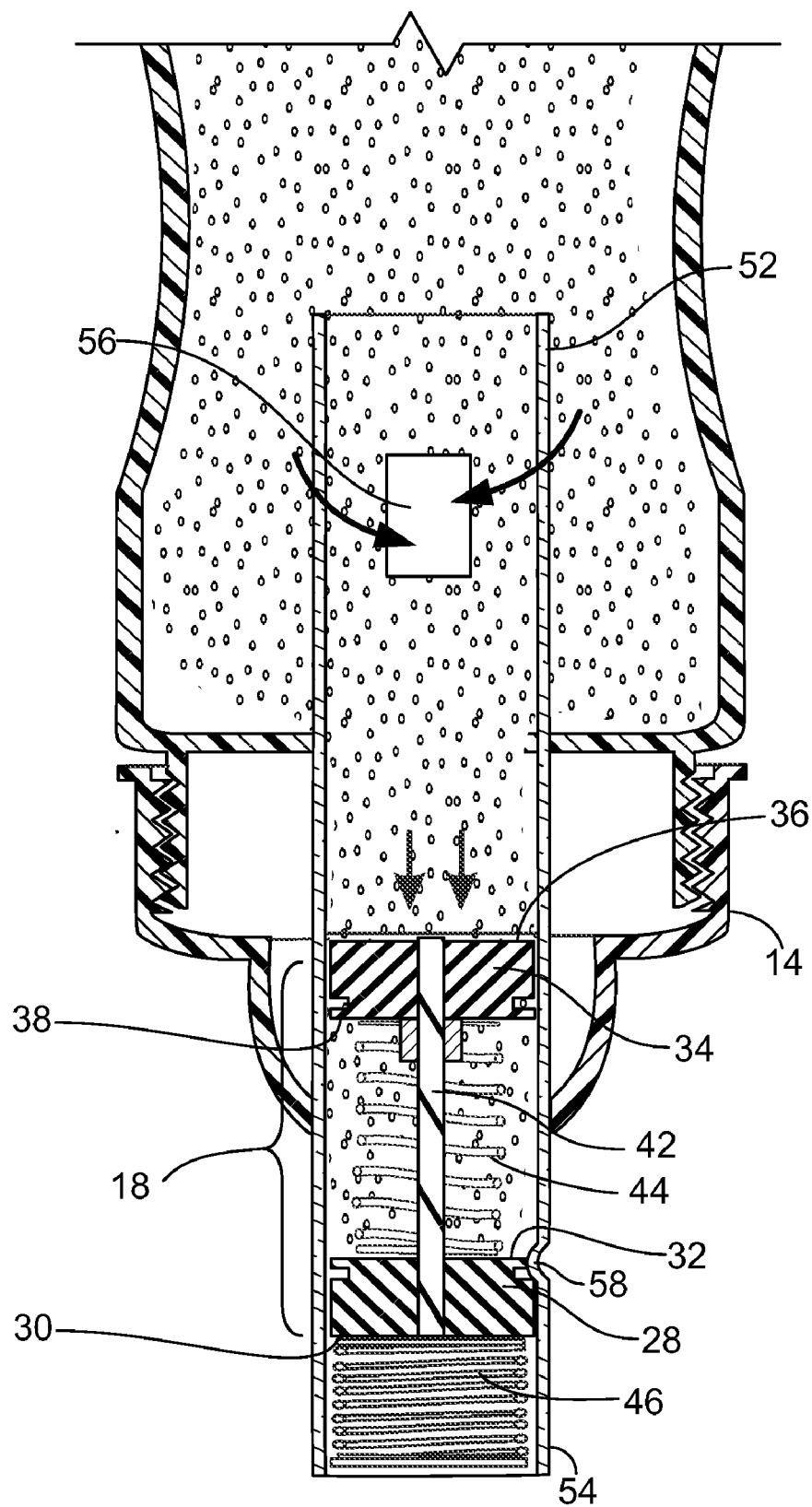

FIG. 6C shows that increased hydrostatic pressure on the bottom 36 of the second piston 34 will push the piston assembly 18 down the cylinder 16 without closing the space between the pistons, either because the material between the pistons 28 and 34 is incompressible or, as described below, because the stiffness (spring constant) of the separation spring 44 is greater than the stiffness (spring constant) of the return spring 46. As the piston assembly 18 travels down the cylinder 16, the face 32 of the first piston 28 eventually passes the second opening 58 in the cylinder 16. When the top 32 of the first piston 28 passes below the second opening 58, the sectioned-off material in the piston assembly "sees" atmospheric pressure. Continued pressure on the bottom 36 of the second piston 34 forces the second piston 34 downward, sliding over the connector 42 toward the first piston 28 and pumping the sectioned-off material out through the second opening 58.

Figure 6D:
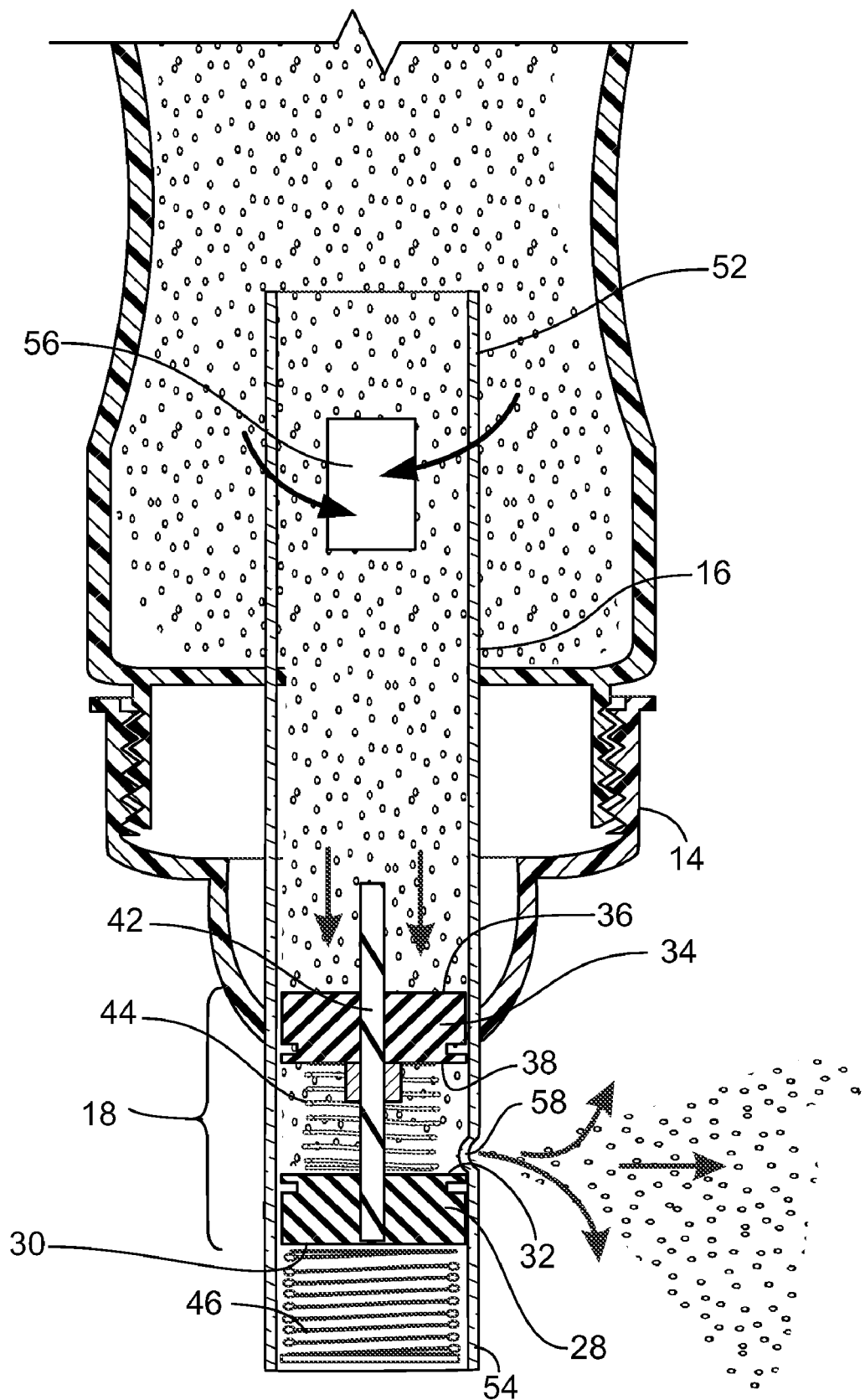

In FIG. 6D, the dispenser 10 is depicted with the top 32 of the first piston 28 as having traveled past the second opening 58. Material sectioned off between the two pistons 28 and 34 is pumped out from the cylinder 16 through the second opening 58 by hydrostatic pressure on the bottom 36 of the second piston 34. Note that the figure also shows that the piston separation spring 44 is compressed in response to the hydrostatic pressure, as is the piston return spring 46.

Those of ordinary skill in the art will recognize that the compressed return spring 46 and the compressed piston separation spring 44, store mechanical energy. Energy stored in the springs will be released when hydrostatic pressure in the reservoir is released allowing the springs to expand. The piston return spring 46 and the piston separation spring 44 respective expansions will therefore be determined by their corresponding spring constants. The spring constants are therefore selected to imbue the dispenser with various different operating characteristics, namely the ability to draw material back into the reservoir and to obviate the need for a check valve 20.

If the spring constant for the piston separation spring 44 is greater than that of the return spring 46, and if the space 40 between the two pistons is not filled with material, hydrostatic pressure exerted on the bottom 36 of the second piston 34 will not exert pressure on the sectioned-off material between the two pistons until the return spring 46 is fully compressed because the force required to compress the separation spring 44 will exceed the force required to compress the return spring 46. Stated another way, hydrostatic pressure on the bottom 36 of the second piston 34 will be transmitted through the second piston 34 and into the separation spring 44 and will overcome the opposing force of the return spring 46, before the hydrostatic force overcomes the opposing force provided by the piston separation spring 44. When the return spring 46 is fully compressed, or when the piston assembly 18 reaches the bottom of its travel in the cylinder 16, hydrostatic pressure on the bottom 36 of the second piston 34 can exert pressure on the material between the pistons, which will cause the material to be dispensed. After all of the sectioned-off material has been dispensed, releasing the pressure on the reservoir will abate the hydrostatic pressure on the bottom 36 of the second piston 34, after which the separation spring 44, having a spring constant greater than the return spring 46, will cause the pistons 28 and 34 to separate from each other before the return spring 46 is able to move the piston assembly 18 back up the cylinder 16. As the pistons 28 and 34 separate, a vacuum can be created at the second opening 58 that will tend to draw material left behind at the opening 58, back into the piston assembly 18. A piston separation spring 44 that is stronger than the return spring 46 will therefore tend to cause material that did not leave the piston assembly 18 to be drawn back in, once pressure on the reservoir is removed.

If, on the other hand, the spring constant of the return spring 46 is greater than the spring constant of the separation spring 44 and if the space between the two pistons 28 and 34 is not completely filled, hydrostatic pressure on the bottom 36 of the second piston 34 will cause the second piston 34 to compress the separation spring 44 until the head 38 of the second piston 34 engages the incompressible sectioned-off material between the pistons. Hydrostatic pressure on the sectioned-off material will thereafter be transmitted to the return spring 46 through the first piston 28. When the piston assembly 18 bottoms out, and after the sectioned off material has been dispensed, releasing the hydrostatic pressure on the reservoir 12 will allow the return spring 46 to move the piston assembly 18 toward the reservoir 12 before the separation spring 44 separates the pistons.

It should be noted that whether the return spring 46 constant is greater or less than the separation spring 44 constant, releasing the hydrostatic pressure on the reservoir can allow air to be drawn back into the cylinder 16 through the second opening 58. The check valve 20 in the bottom 13 of the reservoir might therefore not be needed if the volume of material in the discharge cycle, described above and depicted in FIGS. 6A-6D, equals the volume of air drawn into the cylinder the retraction cycle. Stated another way, the check valve is not needed in at least one alternate embodiment.

The outside diameters of the pistons 28 and 34 are preferably the same and just slightly smaller than the inside diameter of the cylinder 16. The fit between the pistons 28 and 34 and cylinder 16 is selected to provide a clearance between the pistons and interior surface of the cylinder 16 that is sufficiently close to substantially prevent viscous material from leaking past the pistons 28 and 34 as they travel back and forth in the cylinder 16. Ring grooves 60 are provided to the pistons 28 and 34, which accept an O-ring to help seal the pistons when the dispenser 10 is used to dispense low viscosity materials such as water, vinegar, oils or mixtures thereof.

Those of ordinary skill in the art will recognize that as the clearance between the pistons 28 and 34 and the wall of cylinder 16 gets smaller, the leakage of material past the pistons will decrease, however, the resulting friction between their respective surfaces will also increase. The clearance between the pistons and cylinder 16 will therefore affect the force on the reservoir that is required to dispense material. In some applications, it might be preferable to allow some material to leak past the pistons 28 and 34 in order to reduce the compressive force on the reservoir 12 required to dispense material from the dispenser 10.

FIG. 7 depicts an alternate embodiment of the cylinder 16A and piston assembly 18A by which material can be dispensed axially from the cylinder rather than in a radial direction (radial from the axis of the cylinder 12) as shown in FIGS. 1-6. In FIG. 7, both pistons 28A and 34A have holes 59 and 61 formed into their centers, the inside diameters of which allow the pistons 28A and 34A to move back and forth over the connector 42A, which is fixed in the cylinder 12.

An intermediate opening or hole 57 is formed into the connector 42A near the bottom of the cylinder 16A to intersect a channel 62 formed into the center or middle of the connector 42A. The intermediate opening 57 and channel 62 thus form an L-shaped passageway for sectioned-off material to flow through to be dispensed. When the piston assembly 18A reaches the bottom of its travel in the cylinder 16A, i.e., where the top 32A of the first piston 28A clears the intermediate opening 57. Hydrostatic pressure applied to the bottom 36A of the second piston 34A pushes the second piston 34A downward, forcing sectioned off material between the pistons, through the intermediate opening 57, down the channel 62 and out the second opening 58A. The direction of effluent is axial, i.e., parallel to the lengthwise axis of the cylinder 16A.

The intermediate opening 57 in FIG. 7 is a single hole that extends from the exterior surface of the connector 42A inwardly. Alternate embodiments include two or more such holes spaced around the circumference of the connector 42 so as to provide more passageways, having more area, for material to flow into the central channel 62.

FIG. 8 depicts yet another embodiment of a fixed volume viscous liquid dispenser wherein relatively small amounts of material can be dispensed. In FIG. 8, the connector 42B has two different sections having two different outside diameters denoted in the figure as D1 and D2. D1 is smaller than D2.

The first and second pistons 28B and 34B are formed to have central holes, with corresponding inside diameters selected to allow the first piston 28B to slide over the smaller or thinner-diameter D1 section of the connector 42B but not the larger or thicker-diameter D2, second section of the connector 42. The first piston 28B thus does not travel higher in the cylinder 16B than the bottom of the large diameter section D2. The first opening 56B, which allows material from the reservoir to flow into the piston assembly 18B, is between the two pistons 28B and 34B.

Since the larger-diameter D2 section of the connector 42 occupies most of the volume between the two pistons 28 and 34 that would otherwise fill with material to be dispensed, increasing the diameter of the connector 42 between the two pistons 28B and 34B decreases the volume of sectioned-off material that can be dispensed.

As shown in FIG. 8, the fully-compressed length of the piston return spring 46B is such that the height of the piston return spring 46B, stops the downward travel of the piston assembly 18B where the top 32B of the first piston 28 just clears an intermediate opening 59 formed into the connector 42B, analogous to the intermediate opening 57 shown in FIG. 7. Hydrostatic pressure on the top 36B of the second piston 34B forces the relatively smaller amount of material sectioned off between the two pistons 28B and 34B to travel through the intermediate opening 59 and down an axial conduit or passageway formed into the connector such that a relatively small amount of material can be dispensed axially. As with the embodiment shown in FIG. 8, two or more intermediate openings 57 can be formed into the connector 42 to increase the area of the conduit that conducts sectioned-off material from the piston assembly.

Figure 9:
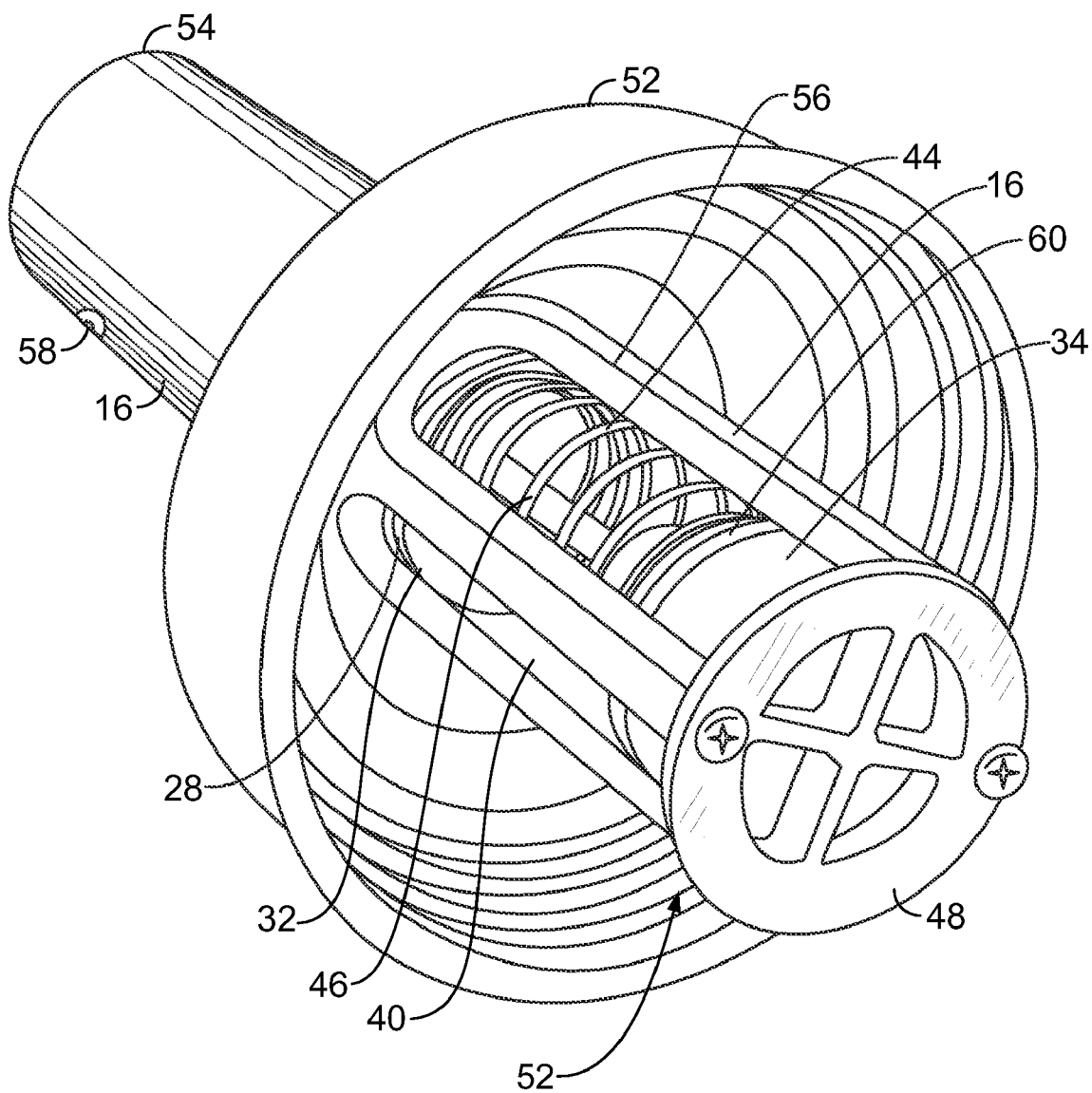
FIG. 9 is interior view of the cap showing the piston assembly.

FIG. 9 is a perspective view of the cylinder 16 depicted in FIGS. 1-6, looking into the cylinder 16 from the first part 24 of the cylinder and toward the second opening 58. The piston assembly 18 and its components are depicted at a "first position" in the cylinder 16. The top or head 32 of the first piston 28 is partially visible through the first opening 56 in the cylinder 12. A ring groove 60 in the second piston 34 is also partially visible, albeit without an O-ring. The piston separation spring 44 is coiled around the connector shaft 46.

The ability of a viscous material to flow into the void 40 between the two pistons via the first opening 56 in the cylinder 16 will depend on various factors that include the viscosity of the material as well as the area of the opening. In FIGS. 6A-6D and in FIG. 9, the first opening 56 in the cylinder 16 is depicted as a rectangular opening. In FIG. 9, however, as in the preferred embodiment, the first opening 56 is comprised of relatively large, rectangular slots, which enable relatively heavy, viscous materials like ketchup, mustard, mayonnaise and the like, to flow into the piston assembly 18 more quickly and easily than it would through a smaller opening. Smaller openings in the cylinder 16 are nevertheless suitable for less viscous materials like salad oils and/or vinegar.

Some condiments such as tartar source, salad dressing and relish include particles, some of which might not pass through the openings 56 and 58 completely, including other openings denominated with "56" and "58" and a suffix letter, depicted in other figures. In alternate embodiments, one or both of the piston heads 32 and 38 and/or one or both of the piston skirts of the pistons 28 and 34 (including other piston heads and skirts of other embodiments depicted in other figures) are provided with knife or knife-like edges 100 to cut through and/or cut off particulates in the material from the reservoir 12 that might get stuck in the openings 56 and 58. Providing the piston heads and/or piston skirts with knife or knife-like edges enables hydrostatic force applied by the user to keep the openings 56 and 58 free and clear of particles that might interfere with the translation of the piston assembly in the cylinder 16.

As used herein, the "first position" 33 of the assembly 18 is the position of the piston assembly 18 depicted in FIG. 6A and in FIG. 9 which is to say, the location of the piston assembly 18 to which the piston return spring 46 drives the piston assembly 18 when the reservoir 12 is relaxed, i.e., when there is no pressure or force exerted on the reservoir 12. The "second position" 34 of the piston assembly 18 is considered to be the position of the piston assembly 18 depicted in FIG. 6D, i.e., at the bottom of its travel in the cylinder.

FIGS. 10-20 depict cross sections of alternate and equivalent embodiments of the cylinder and piston assembly. As with the structure shown in FIGS. 1-9, the structures shown in each of FIGS. 10-20 section off material from an associated reservoir, such as the one depicted in FIG. 1. They translate the sectioned off material down a cylinder or cylinder equivalent and, they dispense the sectioned off material. The structures also act as, or include a first valve that closes to cut off the reservoir from the cylinder as the piston assembly moves down the cylinder. They also act as, or include, a second valve that opens when the first piston goes below or past the second opening in the cylinder, enabling sectioned off material to be dispensed.

Figure 10A:
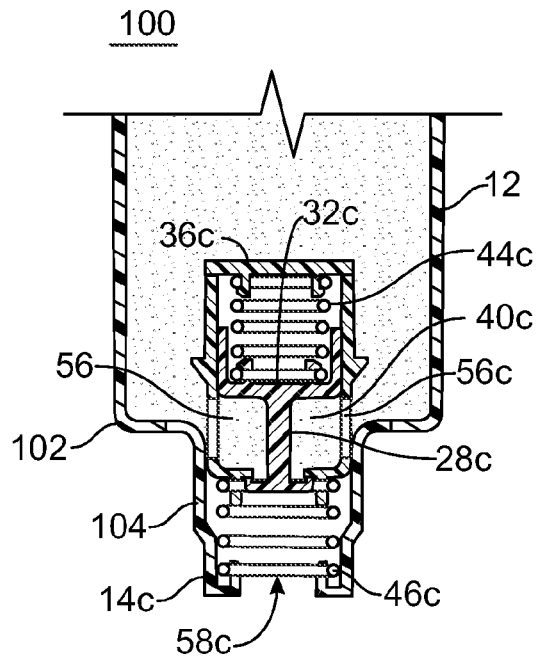
Figure 10B:
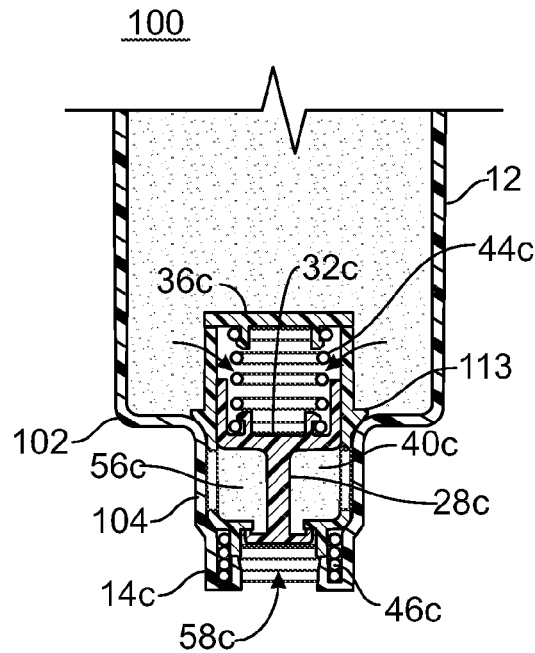
Figure 10C:
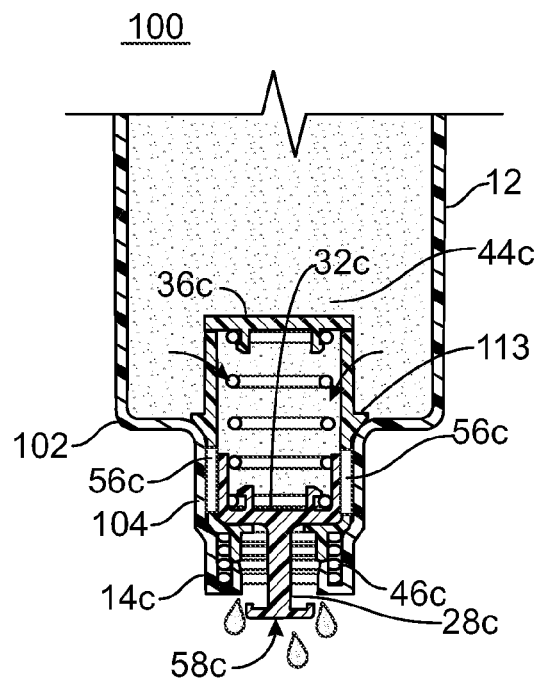

Referring now to FIG. 10 and more particularly to FIGS. 10A-10C, there is depicted an alternate embodiment of a cap and cylinder/piston assembly 100 for a fixed-volume liquid dispenser 100. A neck 104 section accommodates two telescoping pistons 28C and 34C, the second of which (110) has the shape of the letter T. A piston return spring 46C holds the first piston 28C in a normally-up position, within the reservoir 12. A piston separation spring 44C holds the second piston 110 in an up position, i.e., within the first piston 28C.

The first piston 28C is sized to slide up and down in the neck 104 in response to hydrostatic force from the reservoir 12 as well as the piston return spring 46C. The second piston 34C is sized to slide up and down within the first piston 28C in response to hydrostatic pressure and the piston separation spring 44C. The two pistons 108 and 110 thus telescope within each other and the neck 104 in response to forces exerted on them by the piston return spring 46C and the piston separation spring 44C and in response to hydrostatic pressure on the bottoms 109 and 111 of the two pistons 28C and 34C.

Referring now to FIG. 10A, both pistons are in their normally up positions. Material to be dispensed flows into a void 40C between the first piston 28C and the second piston 110 via openings 56C formed in the sidewall of the first piston 28C. As shown in FIG. 10B, hydrostatic pressure on the bottom 111 of the second piston 34D drives both pistons down the neck 104 until a stop or ridge 113 on the outside surface of the first piston 28C reaches the bottom of the neck 104 thereby stopping the first piston 108 from traveling farther down the neck 104. As shown in FIG. 10C, additional hydrostatic pressure on the bottom 111 of the second piston 110 forces the piston 34C further downward relative to the first piston 28C and the neck 104, to expel from the opening 58, material that was sectioned off between the two pistons. When the hydrostatic pressure is released, the separation spring 44A and the piston return spring 46A restore the pistons to their starting positions depicted in FIG. 10A.

Figure 11A:
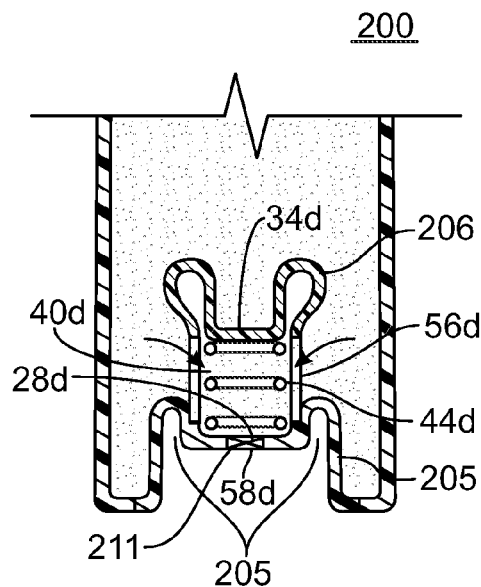
Figure 11B:
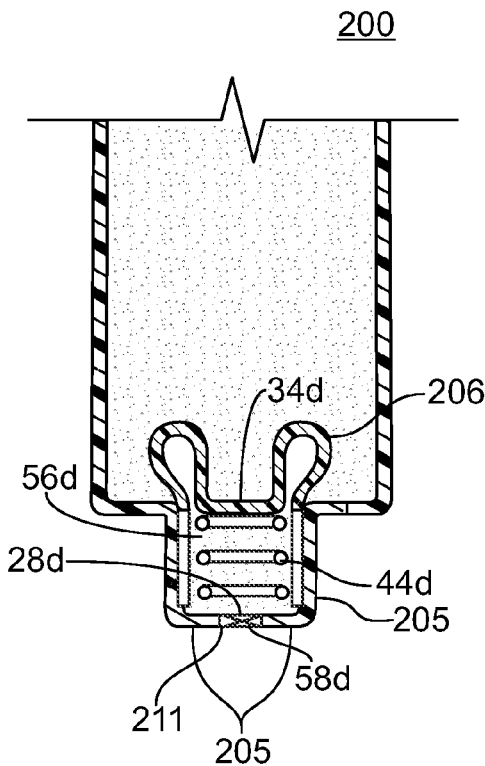
Figure 11C:
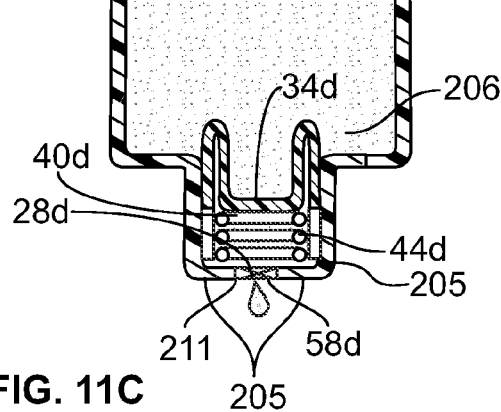

FIGS. 11A-11C depict a cross section of yet another alternate embodiment of a cylinder and piston assembly 200. The embodiment shown in FIG. 11 is constructed of flexible elastomeric material and uses only a piston separation spring 44D.

A first piston 28D is formed with a flexible, rolling diaphragm 205, the cross section of which has the shape of an inverted letter j. A relatively flat region of the first piston 28D includes an integral valve 211 which opens and closes responsive to pressure applied to the piston 28D from the reservoir. A first opening 56D formed in the sidewall of the cylinder 16D allows material to enter the space 40D between the two pistons.

A second piston 34D is also formed with a rolling diaphragm 20, the cross section of which is reminiscent of a rowlock or oarlock arch as shown in the figure. The rolling diaphragm 206 and the rolling diaphragm 205, roll and unroll as the pistons 28D and 34D move up and down, relative to the reservoir, in response to hydrostatic pressure applied to their flat surfaces.

In FIG. 11B, hydrostatic pressure applied to the first piston 28D drives the piston downward, stretching the piston return spring 46D and causing the rolling diaphragm 205 to unroll or straighten as the piston 28D travels downward. As the diaphragm unrolls, it closes the first opening 56D. Sectioned-off material between the first piston 207 and the second piston 204 travels downwardly with the piston assembly 200.

In FIG. 11C, hydrostatic pressure from the reservoir causes the second rolling diaphragm 206 to straighten as the piston 34D travels downward. As the second piston 34D travels downward in response to pressure applied to it, it forces sectioned off material in the space 40D between the two pistons, through the valve 58D.

When hydrostatic pressure is released, the material from which the rolling diaphragms is formed, returns to its original shape, i.e., as depicted in FIG. 11A. The piston separation spring 44D drives the second piston 34D back to its starting position.

Figure 12A:
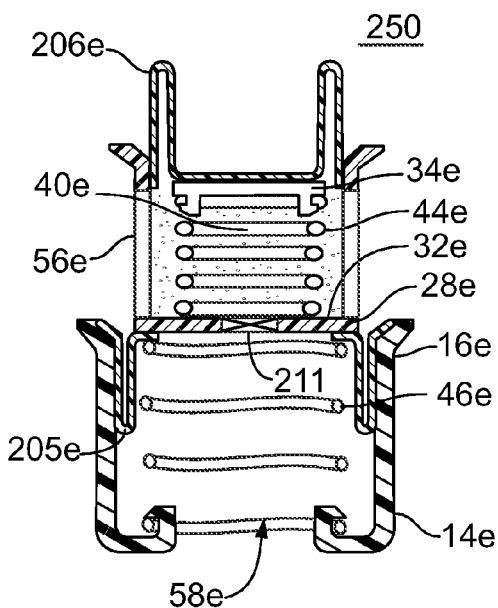
Figure 12B:
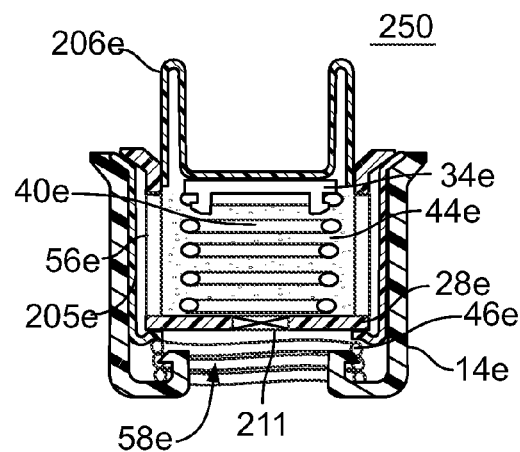
Figure 12C:
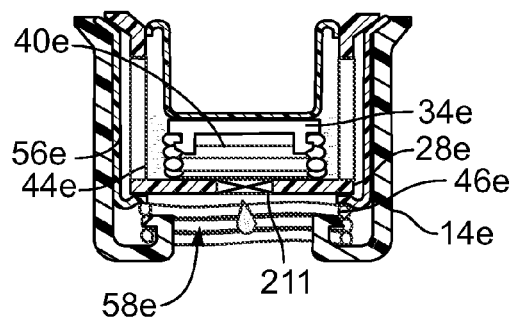

FIGS. 12A-12C depict a cross section of yet another alternate embodiment 250 of a cylinder and piston assembly for dispensing fixed amounts of a viscous fluid from a reservoir, such as the reservoir 12 described above. The embodiment depicted in FIGS. 12A -12C uses flexible rolling diaphragms like the embodiment depicted in FIGS. 11A-11C.

A first piston 28E is embodied as a relatively rigid, flat disk of plastic, attached to a flexible and resilient, diaphragm 205E, the cross section of which is reminiscent of an inverted letter U. A second piston 34E is also embodied as a relatively rigid plastic disc attached to a second flexible and resilient diaphragm 206E having a cross section in the shape of an upright letter U.

A piston separation spring 44E keeps the pistons separated from each other when hydrostatic pressure is not present. The space 40E between the two pistons 28E and 34E defines an open void into which material to be dispensed, flows through an first opening 56E from a reservoir, not shown. In FIG. 12B, hydrostatic pressure applied to the top 28E of the first piston 28E causes the first piston 28E to translate down a cylindrical frame 16E, unraveling the diaphragm 205E as the piston 28E travels downward and closing the first opening 56E with the material of the diaphragm 205E. The hydrostatic pressure that drives the piston 28E downward, toward the opening 58, compresses the piston return spring 46E as shown. In FIG. 12C, additional hydrostatic pressure drives the second piston 34E downward, forcing material in the space 40E to be dispensed through the integral valve 211 and out the second opening 58E.

Figure 13A:
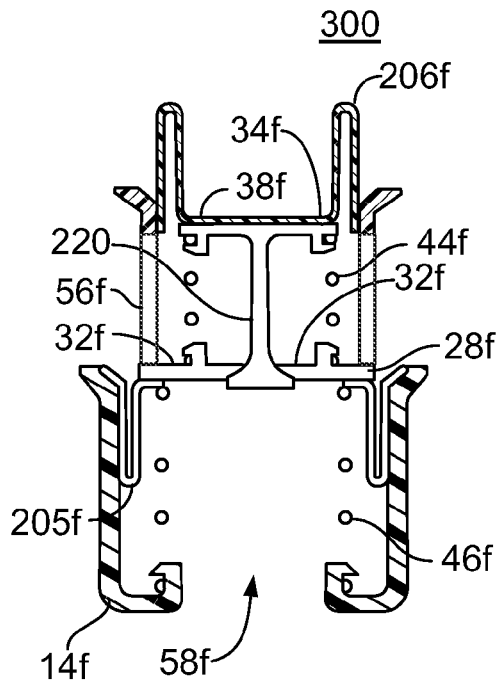
Figure 13B:
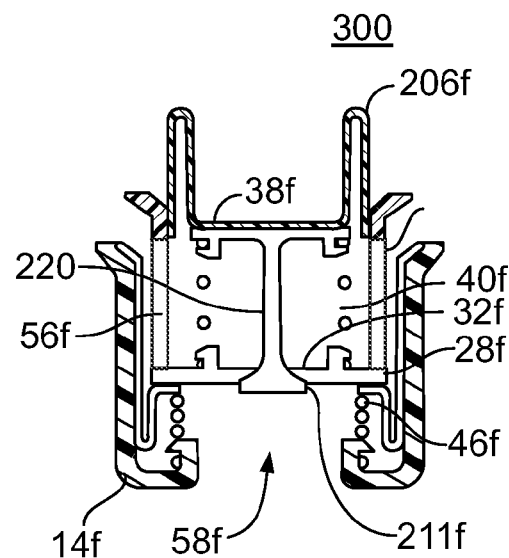
Figure 13C:
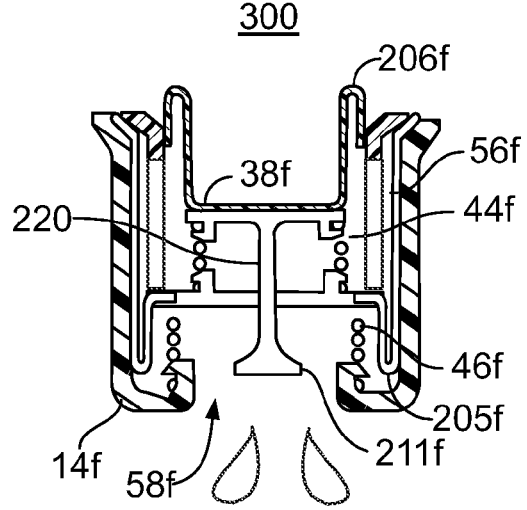

In FIG. 13A, a first piston 28F and a second piston 34F are subjected to hydrostatic pressure. FIG. 13B, hydrostatic pressure applied to the top 32F of the first piston 28F causes the piston 28F to travel downward, unraveling the first diaphragm 205F. As the first piston 28F travels downward, it unravels the first diaphragm 205F, which closes off the first opening 56F through which material flowed from the reservoir (not shown) and into the void 40F between the pistons 28F and 34F. As the pistons move downward, they first compresses the piston return spring 46F, followed by the compression of the piston separation spring 44F. As can be seen in FIG. 13C, additional pressure on the bottom 38F of the second piston 34F causes a valve 302 to open, through which sectioned off material in the void 40F can flow out of and out of the second opening 58F.

Figure 14A:
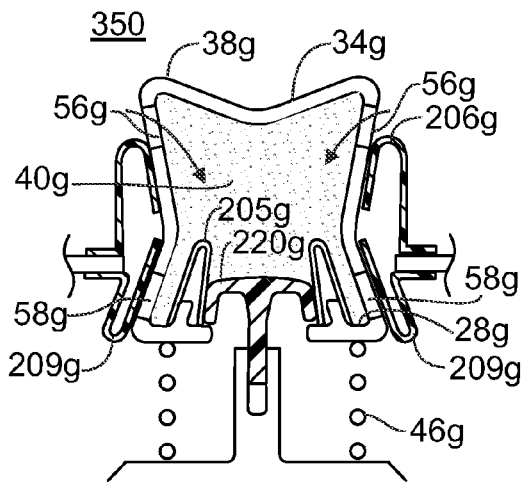
Figure 14B:
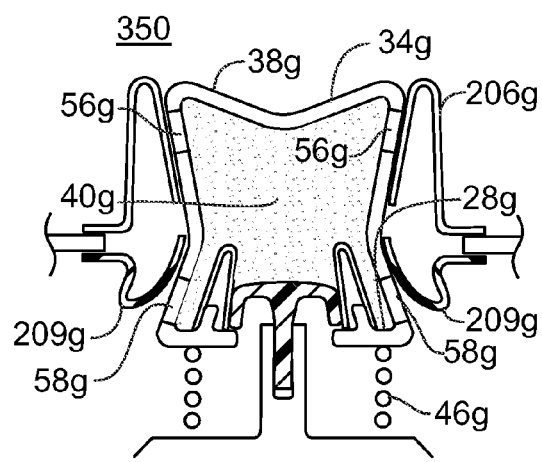
Figure 14C:
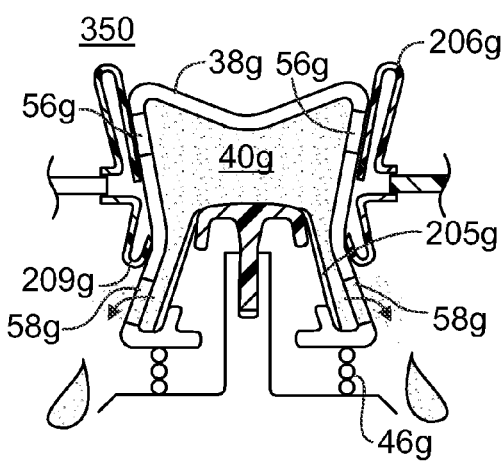

FIGS. 14A-14C, depict yet another apparatus for sectioning off a fixed volume of material from a reservoir, translating the sectioned-off material down a cylinder and dispensing it. As with the embodiments depicted in FIGS. 12 and 13, the embodiment shown in FIGS. 14A-14C uses diaphragms that are formed from elastomeric material and which unravel or unroll.

In FIG. 14A, material to be dispensed, flows through the "first" openings 56G into a void 40G located between the first piston 28G and a second piston 34G. In FIG. 14, the first piston 28G is an annular region surrounding a first elastomeric diaphragm 205G. Note that in FIGS. 14A, a third elastomeric diaphragm 209G covers and closes a second opening 58G.

After the void 40G is filled with material, squeezing the reservoir will increase the hydrostatic pressure on the annulus-shaped first piston 28G, exerting a downward force that drives the entire assembly of FIG. 14A downward as shown in FIG. 4B. The downward travel of the assembly causes the second diaphragm 206G to roll over the and close the first opening 56G. Closing the first opening 56G results in hydrostatic pressure being applied to the "bottom" 38G of the second piston 34G, driving the entire assembly further downward as shown in FIG. 14C.

In FIG. 14C, the third diaphragm 209G is rolled away from the second opening 58G, allowing material sectioned off between the pistons to be pumped out of the piston assembly.

Figure 15A:
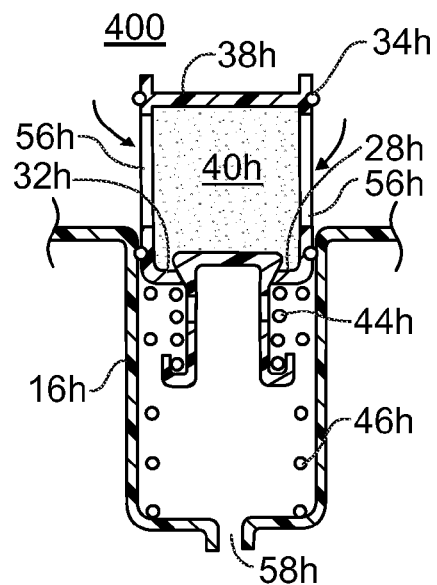
Figure 15B:
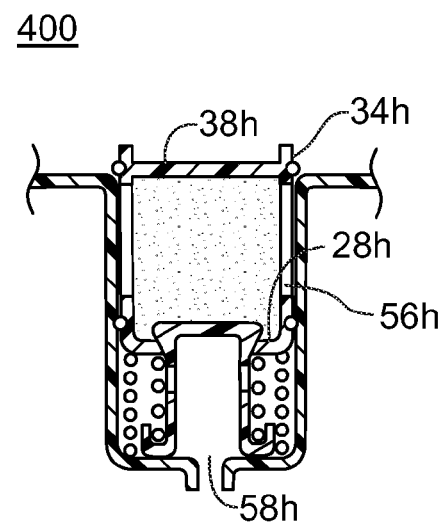

In FIG. 15A, material to be dispensed flows through the first opening 56H into the void region 40H between a first piston 28H and a second piston 34H. Squeezing a reservoir increases the hydrostatic pressure on the piston 28H, driving it downwardly as shown in FIG. 15B. The pistons 28H and 34H are driven downwardly together as shown in FIG. 15B which also shows that as the pistons are driven downwardly, the first opening 56H is closed.

Figure 15C:
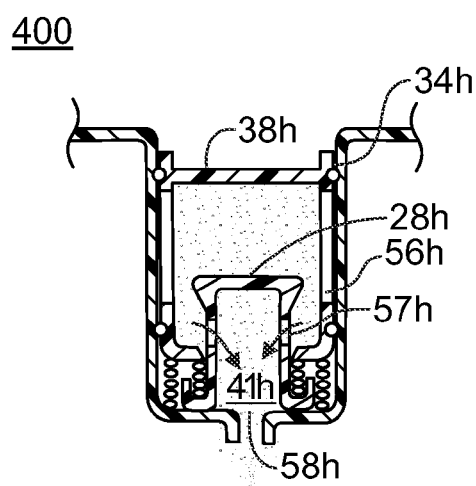

Additional hydrostatic pressure is thereafter applied to the bottom 38H of the second piston 34H. As shown in FIG. 15C, additional downward force on the bottom 38H of the first piston 34H causes the skirt the piston to be pushed below the first piston 28H crown, opening a passageway 57H through which sectioned off material in full into a secondary void 41H and from there out to the second opening 58H.

Figure 16A:
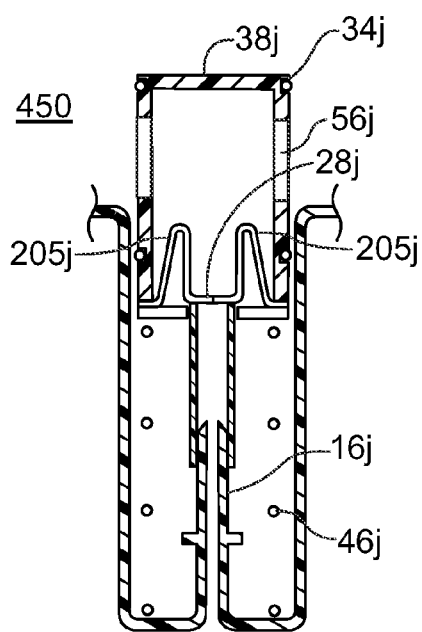
Figure 16B:
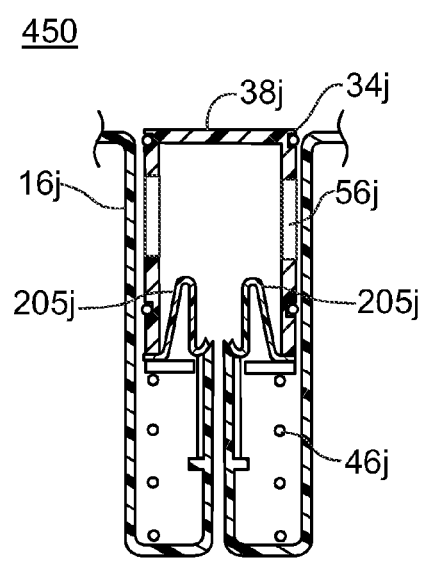
Figure 16C:
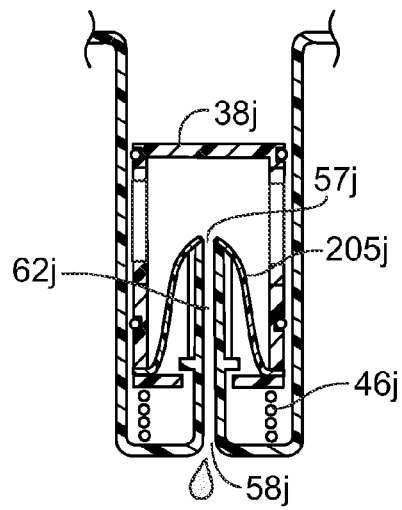

Referring now to FIG. 16A-16C, hydrostatic pressure applied to the first piston 28J, drives the piston assembly of pistons 28J and 34J, downward as shown in FIG. 16B. As the assembly of 28J and 34J are driven downwardly, the first opening 56J falls below the top of the cylinder 16J thereby closing off the first opening 506J. Hydrostatic pressure applied to the bottom 38J of the second piston 34K pushes the assembly down further as shown in FIG. 16C. When the assembly reaches the bottom of travel, the flexible diaphragm 205J is then unraveled, opening an orifice 57J through which material in the void 40J can flow into passage 62J and exit from the second opening 58J.

Figure 17A:
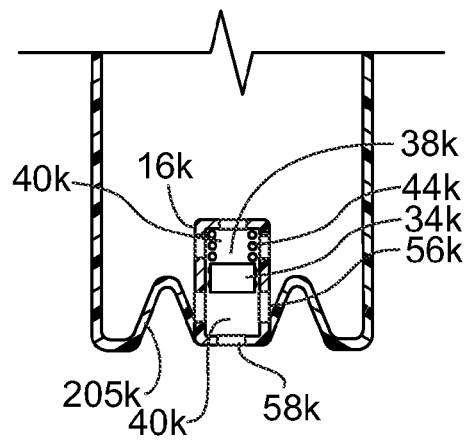
Figure 17B:
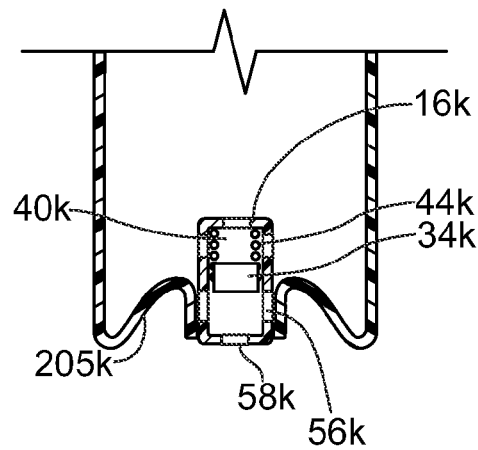
Figure 17C:
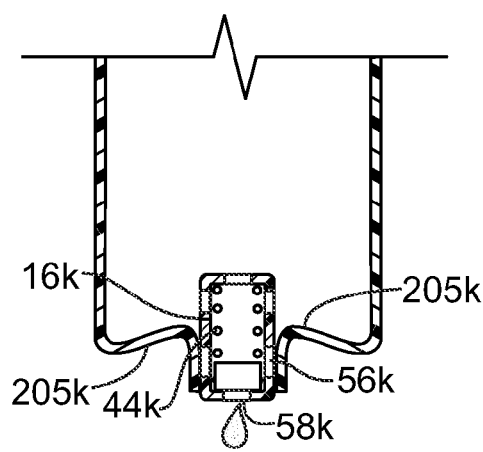

In FIG. 17A, the first opening 56K is near the bottom of a relatively rigid cylinder 16K, that includes a single piston 34K. Material flows into the void 40K through the openings 56K. Hydrostatic pressure exerted on the flat surface 32K pushes the cylinder 16K downward, as shown in FIG. 17B. The downward translation of the cylinder 16K causes the diaphragm 205K to roll outwardly and against the wall of cylinder 16K closing off the first opening 56K. Continued pressure drives the piston 34K downward, forcing material from the void 40K out of the second opening 58K as shown in FIG. 17C.

In FIG. 18A, the cylinder 16L is in the shape of the letter U. The "second opening" 58L referred to in the other embodiments is located at the bottom thereof. Two elliptically-shaped flexible flanges 17L and 19L have centrally-located openings through which a double acting piston 39 is able to translate up and down in response to, hydrostatic pressure applied to the top surface 32L of a lower piston portion 28L, and, hydrostatic pressure applied to the bottom 38L of a second piston 34L located at the top of the reciprocating double-acting piston 39.

As shown in FIG. 18A, material flows into the void region 40L through the "first openings" 56L. Hydrostatic pressure applied to the top surface 32L drives the double-acting piston 39 downward, pulling the first flexible flange 17L with it as shown in FIG. 18B. Downward translation of the double acting piston 39 as shown in FIG. 18B and 18C closes the first opening 56L from the reservoir. Thereafter, hydrostatic pressure applied to the bottom 38L of the second piston 34L drives the double acting piston even further down.

In FIG. 16C, the piston assembly 39L is all the way down whereat the first opening 56L effectively becomes the second opening 58L. Material in the void 40L is driven downward by force applied to the bottom surface 38L, which also drives the second flange 19L downward, squeezing material out from the void 40L.

Figure 19A:
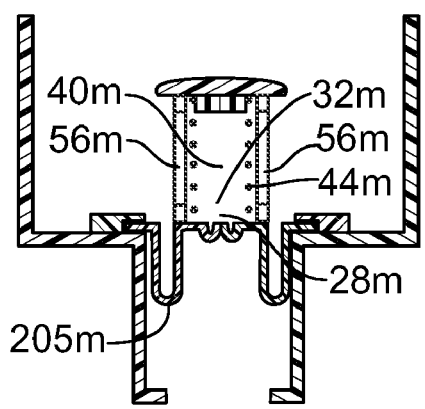
Figure 19B:
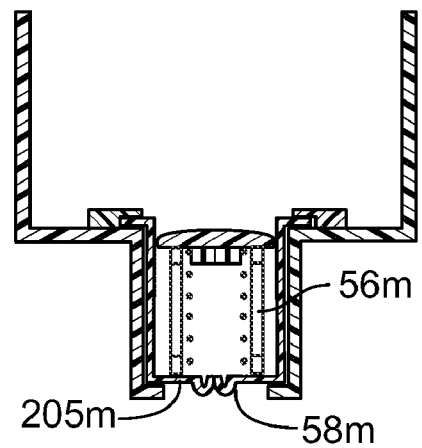
Figure 19C:
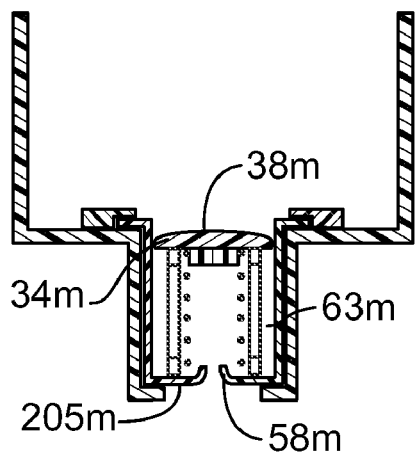

Referring now to FIG. 19A, material flows into the void 40M through the first opening 56M. Hydrostatic pressure is exerted on the sectioned off material in the void 40M and from there, to the top surface 32M of the first piston 28M. The hydrostatic pressure drives the piston assembly downward as shown in FIG. B, closing off the first opening 56M. The pressure drives the second piston 34M further down, as shown in FIG. 19C.

Figure 19D:
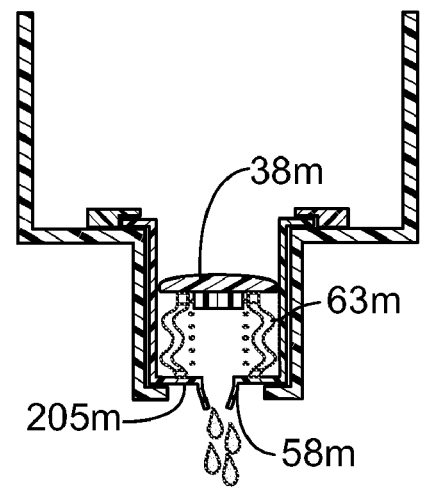

The sidewall of the piston 63 is flexible. As shown in FIG. 19D, the pressure on the surface 38 collapses the sidewall of the piston assembly, driving material from the second opening 58M.

Lastly, FIGS. 20A and 20B show another embodiment whereby material is sectioned off, translated and dispensed. The embodiment of FIG. 20A and 20B differs from the embodiment shown in FIGS. 1-9 in that it does not use a piston connector to limit the separation distance between the two pistons. In FIG. 20A and 20B, the first piston 28N and the second piston 34N are contained inside a cage 80 that translates up and down the cylinder 16 in response to hydrostatic pressure and the piston return spring 46N.

Referring now to FIG. 20A, material to be dispensed flows through a first opening 56N in the cylinder 16 and into the piston assembly comprised of the two pistons 28N and 34N and the cage 80. When the reservoir is compressed, pressure on the top 32N of the first piston 28N drives the first piston 28N and the cage 80 downward. When the top of the second piston 34N or the cage 80 drops below the first opening 56N, hydrostatic pressure is applied to the bottom 36N of the second piston 34N.

In FIG. 20B, the cage 80 has been driven down the cylinder 16 to where the top 32N of the first piston 28N is below the second opening 58N. The downward movement of the cage 80, compresses the piston assembly return spring 46. Hydrostatic pressure on the bottom 36N of the second piston 34N compresses the piston separation spring 44N as it drives material out of the second opening 58N.

Those of ordinary skill in the art will appreciate that the dispensers depicted in the figures and described above can dispense the same amount or substantially the same of material with each and every use. Those of ordinary skill in the art will also appreciate that the dispensers depicted in the figures and described above are relatively simple to operate and maintain. The foregoing description should not be construed as limiting the scope of the invention but is instead for purposes of understanding the invention. The true scope of the invention is set forth in the following claims.

What is claimed is:

1. A dispenser for dispensing a fixed volume of viscous material, said dispenser comprised of:
  a cylinder having first and second ends, said cylinder having a first opening proximate the first end through which viscous material can enter the cylinder and, a second opening proximate the second end from which material can be dispensed; and
  a reciprocating piston assembly within said cylinder comprised of first and second piston, the first and second piston being coupled to a connector, configured to limit a separation distance between the first and second piston, the piston assembly configured to travel between first and second positions in said cylinder, said first and second positions being proximate to the first and second ends of the cylinder, the piston assembly sectioning off material to be dispensed at a first position, translating the sectioned off material down the cylinder to a second position and, forcing sectioned off material from the second opening at said second position in the cylinder by the translation of the first piston toward the second piston responsive to pressure applied to the first piston;
  a piston separation spring between the heads of the first and second pistons, the piston separation spring acting to bias the first and second pistons away from each other;
  a piston assembly return spring between the second end of the cylinder and the piston assembly, the return spring acting to bias the piston assembly toward the first the first position;
  the spring constants of the piston separation spring and the spring constant of the piston assembly return spring being selected to draw material back in the second opening when pressure on the piston assembly is reduced;
  wherein at least one of said first and second pistons is provided with a cutting edge on at least one of a piston head and a piston skirt.

* * * * *